United States Patent [19]

Kurahayashi et al.

[11] 4,229,768
[45] Oct. 21, 1980

[54] INFORMATION PROCESSING APPARATUS

[75] Inventors: Sadasuke Kurahayashi, Tokyo; Yuzo Kato, Yokohama; Asao Watanabe, Higashikurume; Shin Tsuda, Hasuda; Hakaru Muto, Kamakura, all of Japan

[73] Assignee: Canon Kabushiki Kaisha, Tokyo, Japan

[21] Appl. No.: 25,082

[22] Filed: Mar. 29, 1979

[30] Foreign Application Priority Data

| Mar. 30, 1978 | [JP] | Japan | 53-37078 |
| Mar. 30, 1978 | [JP] | Japan | 53-37079 |
| Mar. 30, 1978 | [JP] | Japan | 53-37080 |
| Mar. 30, 1978 | [JP] | Japan | 53-37081 |
| Mar. 30, 1978 | [JP] | Japan | 53-37082 |

[51] Int. Cl.² ............................................. H04N 1/40
[52] U.S. Cl. .............................. 358/261; 340/146.3 H; 358/280
[58] Field of Search ...................... 358/261, 260, 280; 340/146.3 H

[56] References Cited

U.S. PATENT DOCUMENTS

| 3,916,095 | 10/1975 | Weber | 358/261 |
| 4,034,344 | 7/1977 | Saraga | 340/146.3 H |
| 4,034,406 | 7/1977 | Tsuchiya | 358/260 |
| 4,092,675 | 5/1978 | Saran | 358/261 |
| 4,107,648 | 8/1978 | Frank | 340/146.3 H |
| 4,121,259 | 10/1978 | Preuss | 358/261 |
| 4,167,758 | 9/1979 | Rothgordt | 358/261 |

Primary Examiner—Howard W. Britton
Attorney, Agent, or Firm—Fitzpatrick, Cella, Harper & Scinto

[57] ABSTRACT

In the transmission of binary image signals obtained by scanning of an original document, a high signal compression ratio without deterioration in image quality is achieved by subjecting the binary image signals to a selective thinning process in which the signals of a run-length within a determined range are converted into signals of a determined length and by subsequently coding thus selectively thinned signals. A further improved signal compression is also established without deterioration of image quality by conducting, prior to the selective thinning process, preliminary processes such as elimination of isolated dots in the image or smoothing in the principal and auxiliary scanning directions. Furthermore signal compression ratios are increased by preparing state signals representing the correlation between the first image signals present on a first scan line and the second image signals present on a second scan line to encode and transmit the first image signals and the state signals, and still to allow regeneration of the second image signals at the reception end.

Transmission of signals either with coding of a high compression or with a coding of a higher popularity can also be achieved through simple switching of the coding system.

Furthermore there is also provided effective thinning on graphic information which could not be easily handled with the conventional thinning processes.

35 Claims, 51 Drawing Figures

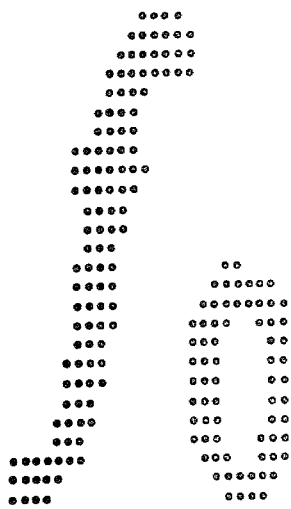
FIG. 4A
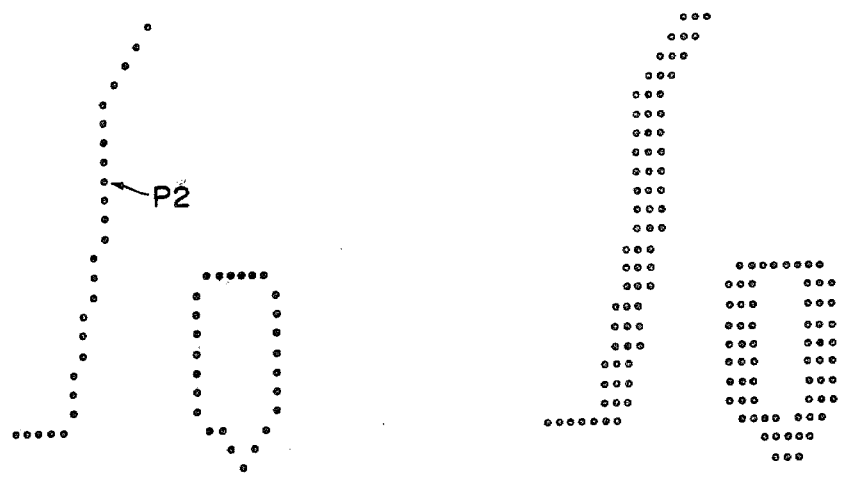
FIG. 4B
FIG. 4C

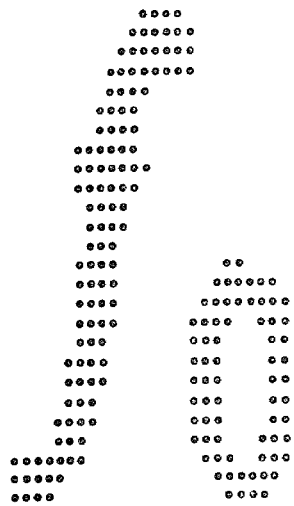
FIG. IIA
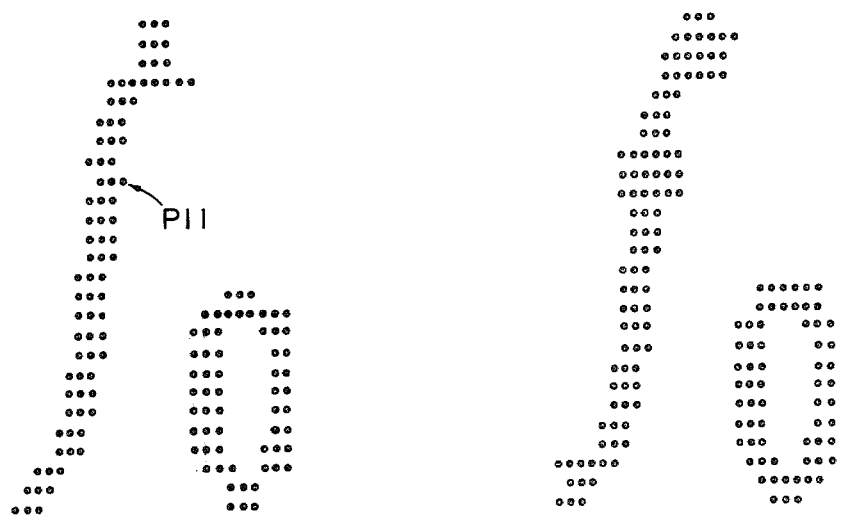
FIG. IIB  FIG. IIC

| WHITE RUN | | BLACK RUN | | |
|---|---|---|---|---|
| WHITE RUN-LENGTH (FOR MMH/MH) | CODES | BLACK RUN-LENGTH (FOR MH) | (FOR MMH) | CODES |
| 0 | 00110101 | 0 | 0 | 00011011 |
| 1 | 000111 | 1 | 9 | 010 |
| 2 | 0111 | 2 | 6 | 11 |
| 3 | 1000 | 3 | 3 | 10 |
| 4 | 1011 | 4 | 2 | 011 |
| 5 | 1100 | 5 | 1 | 0011 |
| 6 | 1110 | 6 | 12 | 0010 |
| 7 | 1111 | 7 | 13 | 00011 |
| 8 | 10011 | 8 | 14 | 000101 |
| 9 | 10100 | 9 | 15 | 000100 |
| 10 | 00111 | 10 | 16 | 0000100 |
| 11 | 01000 | 11 | 17 | 0000101 |
| 12 | 001000 | 12 | 18 | 0000111 |
| 13 | 000011 | 13 | 19 | 00000100 |
| 14 | 110100 | 14 | 20 | 00000111 |
| 15 | 110101 | 15 | 21 | 00001100 |
| 16 | 101010 | 16 | 22 | 00000101 |
| 17 | 101011 | 17 | 23 | 00000100 |
| 18 | 0100111 | 18 | 24 | 000001000 |
| 19 | 0001100 | 19 | 25 | 000011001 |
| 20 | 0001000 | 20 | 26 | 000011000 |
| 21 | 0010111 | 21 | 27 | 000011011 |
| 22 | 0000011 | 22 | 28 | 00000110111 |
| 23 | 0000100 | 23 | 29 | 00000101000 |
| 24 | 0101000 | 24 | 30 | 00000010111 |
| 25 | 0101011 | 25 | 31 | 00000011000 |
| 26 | 0010011 | 26 | 32 | 000011001010 |
| 27 | 0100100 | 27 | 33 | 000011001011 |
| 28 | 0011000 | 28 | 34 | 000011001100 |
| 29 | 00000010 | 29 | 35 | 000011001101 |
| 30 | 00000011 | 30 | 36 | 000001101000 |
| 31 | 00011010 | 31 | 37 | 000001101001 |
| 32 | 00011011 | 32 | 38 | 000001101010 |
| 33 | 00010010 | 33 | 39 | 000001101011 |
| 34 | 00010011 | 34 | 40 | 000011010010 |
| 35 | 00010100 | 35 | 41 | 000011010011 |
| 36 | 00010101 | 36 | 42 | 000011010100 |
| 37 | 00010110 | 37 | 43 | 000011010101 |
| 38 | 00010011 | 38 | 44 | 000011010110 |
| 39 | 00101000 | 39 | 45 | 000011010111 |
| 40 | 00101001 | 40 | 46 | 000001101100 |
| 41 | 00101010 | 41 | 47 | 000001101101 |
| 42 | 00101011 | 42 | 48 | 000011011010 |
| 43 | 00101100 | 43 | 49 | 000011011011 |
| 44 | 00101101 | 44 | 50 | 000001010100 |
| 45 | 00000100 | 45 | 51 | 000001010101 |
| 46 | 00000101 | 46 | 52 | 000001010110 |
| 47 | 00001010 | 47 | 53 | 000001010111 |
| 48 | 00001011 | 48 | 54 | 000001100100 |
| 49 | 01010010 | 49 | 55 | 000001100101 |
| 50 | 01010011 | 50 | 56 | 000001010010 |
| 51 | 01010100 | 51 | 57 | 000001010011 |
| 52 | 01010101 | 52 | 58 | 000000100100 |
| 53 | 00100100 | 53 | 59 | 000000110111 |
| 54 | 00100101 | 54 | 60 | 000000111000 |
| 55 | 01011000 | 55 | 61 | 000000100111 |
| 56 | 01011001 | 56 | 62 | 000000101000 |
| 57 | 01011010 | 57 | 63 | 000001011000 |
| 58 | 01011011 | 58 | | 000001011001 |
| 59 | 01001010 | 59 | | 000000101011 |
| 60 | 01001011 | 60 | | 000000101100 |
| 61 | 00110010 | 61 | | 000001011010 |
| 62 | 00110011 | 62 | | 000001100110 |
| 63 | 00110100 | 63 | | 000001100111 |

FIG. 13A

| WHITE RUN | | BLACK RUN | |
|---|---|---|---|
| WHITE RUN-LENGTH (FOR MMH/MH) | CODES | BLACK RUN-LENGTH (FOR MMH/MH) | CODES |
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| 384 | 00110111 | 384 | 000000110100 |
| 448 | 01100100 | 448 | 000000110101 |
| 512 | 01100101 | 512 | 0000001101100 |
| 576 | 01101000 | 576 | 0000001101101 |
| 640 | 01100111 | 640 | 0000001001010 |
| 704 | 011001100 | 704 | 0000001001011 |
| 768 | 011001101 | 768 | 0000001001100 |
| 832 | 011010010 | 832 | 0000001001101 |
| 896 | 011010011 | 896 | 0000001110010 |
| 960 | 011010100 | 960 | 0000001110011 |
| 1024 | 011010101 | 1024 | 0000001110100 |
| 1088 | 011010110 | 1088 | 0000001110101 |
| 1152 | 011010111 | 1152 | 0000001110110 |
| 1216 | 011011000 | 1216 | 0000001110111 |
| 1280 | 011011001 | 1280 | 0000001010010 |
| 1344 | 011011010 | 1344 | 0000001010011 |
| 1408 | 011011011 | 1408 | 0000001010100 |
| 1472 | 010011000 | 1472 | 0000001010101 |
| 1536 | 010011001 | 1536 | 0000001011010 |
| 1600 | 010011010 | 1600 | 0000001011011 |
| 1664 | 011000 | 1664 | 0000001100100 |
| 1728 | 010011011 | 1728 | 0000001100101 |
| EOL | 00000000001 | EOL | 00000000001 |

FIG. 13B

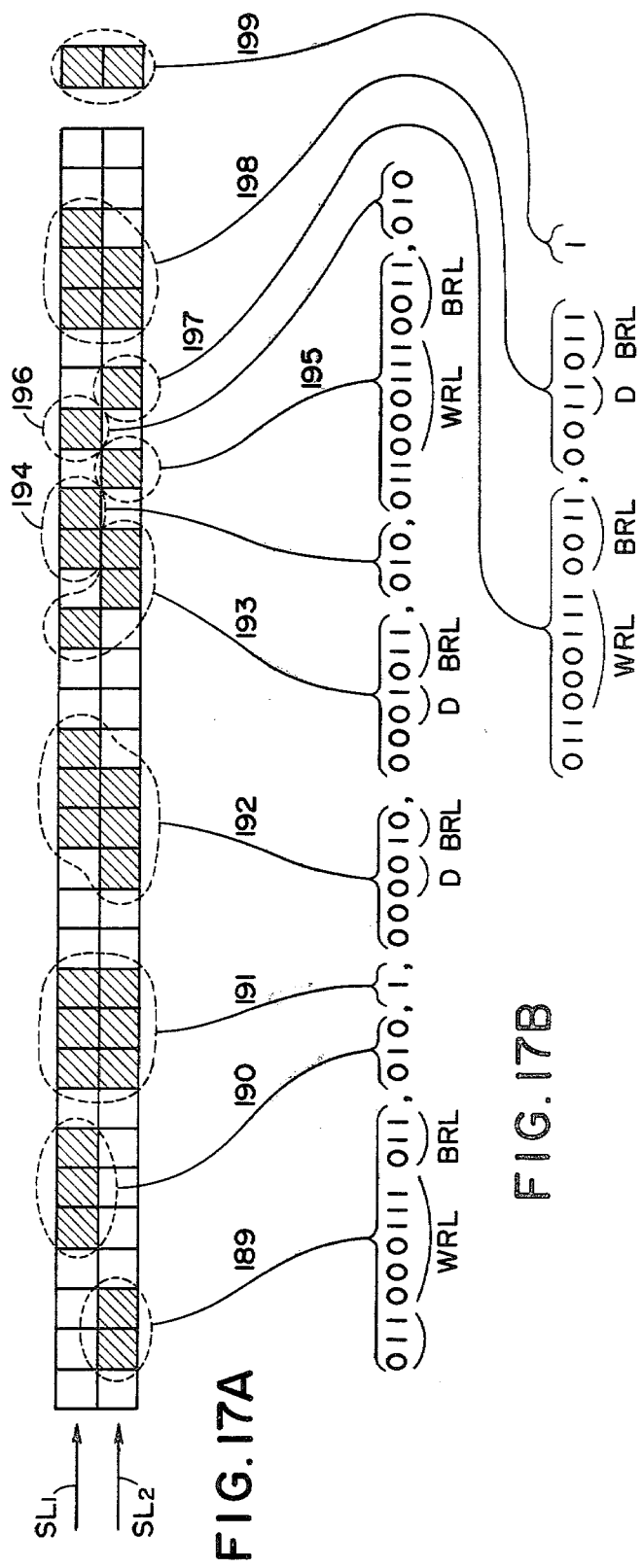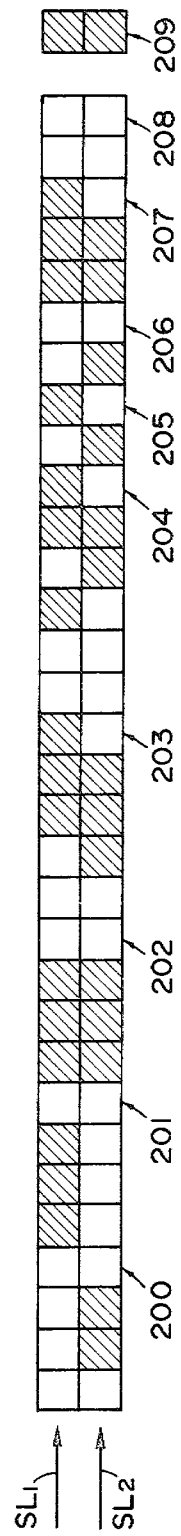
FIG. 17A  FIG. 17B  FIG. 17C

INFORMATION PROCESSING APPARATUS

BACKGROUND OF THE INVENTION

1. Field of the Invention

The present invention relates to an information processing apparatus in which a signal compression ratio is increased without deterioration in image quality by means of a selective thinning process in transmission of binary image signals obtained by scanning of an original document.

2. Description of the Prior Art

In a conventional facsimile apparatus as shown in FIG. 1, the black-and white information recorded on an original document, not shown, is converted, by scanning with a scanner A1, into time-serial binary image or picture signals consisting of a "0" signal representing a white or highlight dot and a "1" signal representing a black or shadow dot. A bandwidth compressor B1 compresses the binary image signals by alloting a code to each of the signals according to the run-length thereof. The thus coded signals are modulated by a modulator C1 into telephone line transmittable signals, i.e. AC signals within a determined frequency band width, and transmitted through a telephone line LT1.

In such facsimile apparatus it is not possible to expect a higher signal compression since the run-lengths of black or white picture elements are faithfully coded. There can be considered various processes, therefore, in order to improve signal compression ratio.

For example in the case of an existence of isolated spots, such as dusts or stains, on an original, the improvement in the compression ratio cannot be expected in the facsimile apparatus shown in FIG. 1 since such noise components are faithfully transmitted in such apparatus. For removing such noise components, therefore, there can be considered a process of eliminating such isolated spots.

Also in conversion of a boundary between black and white areas into binary image signals, there may often result so-called quantizing errors due to unstable identification of black or white levels. It is in fact not only meaningless but also detrimental to the improvement in the signal compression ratio to faithfully encode the binary image signals containing such quantizing errors.

In order to avoid such quantizing errors, there can be considered a smoothing process on such boundaries, which can be applied both in the principal or horizontal scanning direction (as represented by the arrow SC1 in FIG. 3A) and in the auxiliary or vertical scanning direction (as represented by the arrow SC2 in FIG. 3A).

Further, in image or picture information composed of letters, numerals, symbols etc. (hereinafter collectively called "characters"), it is difficult to improve the signal compression ratio is the line thickness is exactly coded despite of the fact that the line thickness of a character has no relation with the meaning thereof. However a socalled thinning process, which eliminates the information representing the line thickness and thus reduces the line thickness of black picture elements to a thickness of approximately one picture element, will inevitably lead to a deterioration in image quality. A more complicated structure of the apparatus though such a process will allow to improve the signal compression ratio. For example FIGS. 3A and 4A respectively show enlarged views of binary coded characters "mbre" and "fo". After the aforementioned elimination of isolated dots and smoothing followed by the aforementioned thinning process, the image quality will be significantly deteriorated as shown in FIGS. 3B and 4B. It will be understood that the character "r" in FIG. 3B lacks the portion P1, and the character "f" in FIG. 4B lacks the portion P2 or horizontal bar. Besides the thinned image as shown in FIG. 3B or FIG. 4B has to be thickened again in the facsimile receiver to obtain a restored image as shown in FIG. 3C or 4C, so that the apparatus inevitably bocomes complicated. For these reasons a signal processing without the drawbacks of the conventional thinning process has been longed for.

SUMMARY OF THE INVENTION

A first object of the present invention is to reduce a deterioration in image quality which would frequently result from a signal compression process.

A second object of the present invention is to improve a signal compression ratio while thus reducing a deterioration in image quality.

A third object of the present invention is to simplify the structure of the signal processing apparatus thereby improving the reliability and reducing the cost thereof.

A fourth object of the present invention is to provide signal processing apparatus applicable to a coding method of a high signal compression as well as of wide popularity.

A fifth object of the present invention is to provide a thinning process effective also for a graphic information.

BRIEF DESCRIPTION OF THE DRAWINGS

FIG. 4A is an enlarged view of another binary coded original pattern;

FIG. 4B is an enlarged view of the pattern after a thinning process;

FIG. 4C is an enlarged view of the pattern of FIG. 4B after a thickening process;

FIG. 11A is an enlarged view of another binary coded original pattern;

FIG. 11B is an enlarged view of the binary coded pattern after a pre-processing followed by a unitary selective thinning process;

FIG. 11C is an enlarged view of the binary coded pattern after a pre-processing followed by a ternary selective thinning process;

FIG. 13A is a table showing the terminate codes;

FIG. 13B is a table showing the make-up codes;

FIG. 17A is a view showing binary image signals of two scan lines;

FIG. 17B is a view showing the binary image signals after the MMH coding;

FIG. 17C is a view showing the positions for classifying the binary image signals into various states.

DESCRIPTION OF THE PREFERRED EMBODIMENTS

Figure 2A:
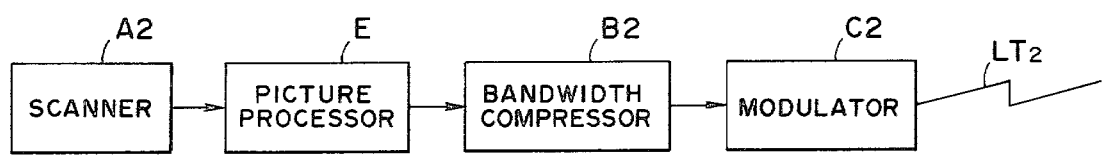
FIG. 2A is a schematic block diagram of an information processing apparatus of the present invention.
Figure 2B:
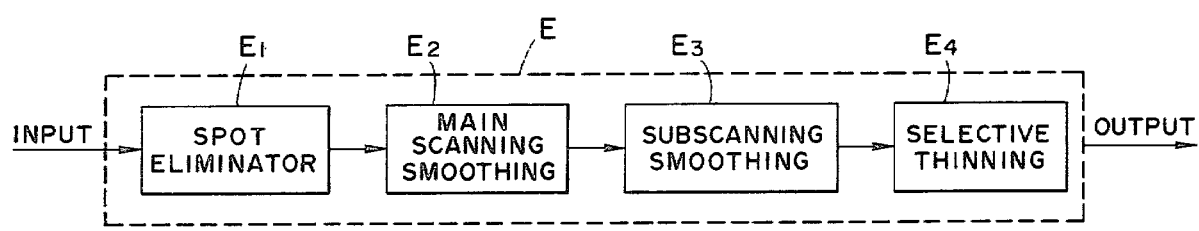
FIG. 2B is a schematic block diagram of an image process.

FIGS. 2A and 2B show the schematic block diagrams of the information processing apparatus in accordance with the present invention. In FIG. 2A, a scanner A2 scans the black-and-white information recorded on an unrepresented original to convert the information into time-serial binary image or picture signals composed of "0" signals corresponding to white or highlight portions and "1" signals corresponding to black or shadow portions. The binary image signals are supplied to a picture processor E in which the signals are subjected to the processes of elimination of isolated spots and smoothing, and further to a ternary selective thinning process for classifying the run-length of signals into three ranges as will be explained later. These processes are conducted to supplement or delete information to or from the binary image signals in such a manner as to achieve a significant signal compression or a reduction in transmission time practically without deterioration of image quality. A bandwidth compressor B2 performs coding and compression by allotting, to thus processed signals, certain codes corresponding to the length of said signals. The thus coded signals are modulated in a modulator C2 and transmitted over a telephone line LT2. The signals thus transmitted are received by a receiver, not shown, to reassemble the original image.

Figure 3A:
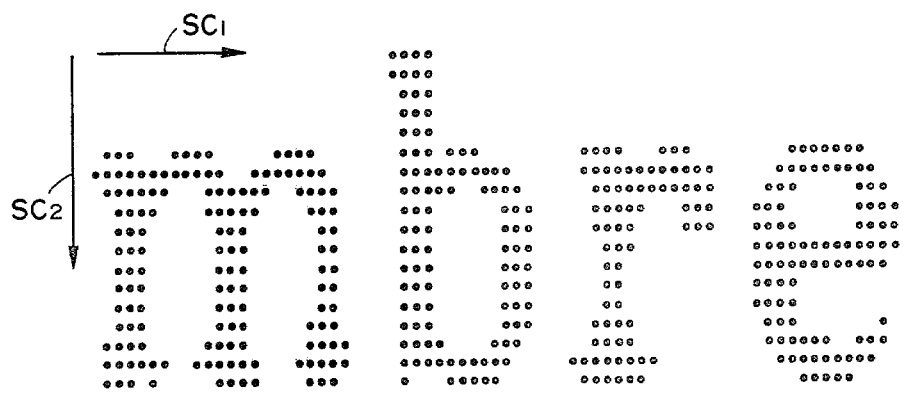
FIG. 3A is an enlarged view of a binary coded original pattern.
Figure 3B:
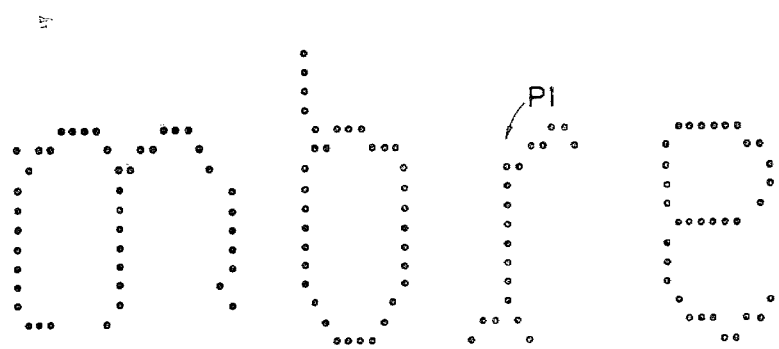
FIG. 3B is an enlarged view of the binary coded pattern after a thinning process.
Figure 3C:
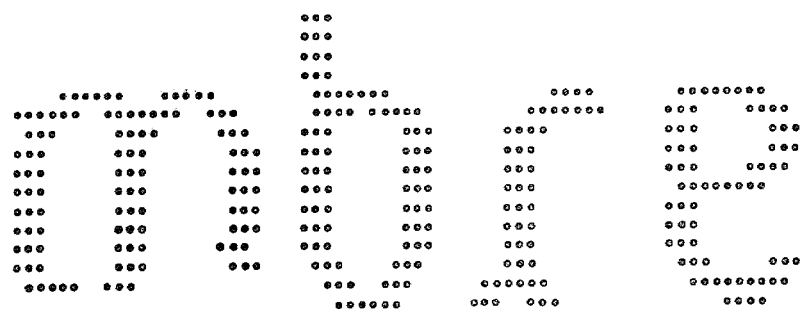
FIG. 3C is an enlarged view of the pattern of FIG. 3B after a thickening process.

The picture processor E shown in FIG. 2A comprises, as shown in FIG. 2B, a spot eliminator E1 for eliminating isolated information constituting a noise component in the image or picture signals, a main or principal scanning smoothing circuit E2 for suppressing the inversion of signals "0" and "1" appearing in the principal scanning direction (as represented by the arrow SC1 in FIG. 3A), a sub-scanning or auxiliary scanning smoothing circuit E3 for suppressing the inversion of signals "0" and "1" appearing in the auxiliary scanning direction (as represented by the arrow SC2 in FIG. 3A), and a selective thinning circuit E4 (a ternary selective thinning circuit in the present embodiment) for converting image signals of a run-length within a determined range into image signals of a determined length. The above-mentioned circuits E1–E4 are mutually independent and may be connected in an interchanged order, for example in the order of E2, E3, E1 and E4 from left to right in FIG. 2B. It is to be noted, however, that the compression ratio of the obtained signals becomes different in such an interchanged order.

The functions of circuits E1–E4 shown in FIG. 2B will be explained more detailedly in the following.

Figure 5A:
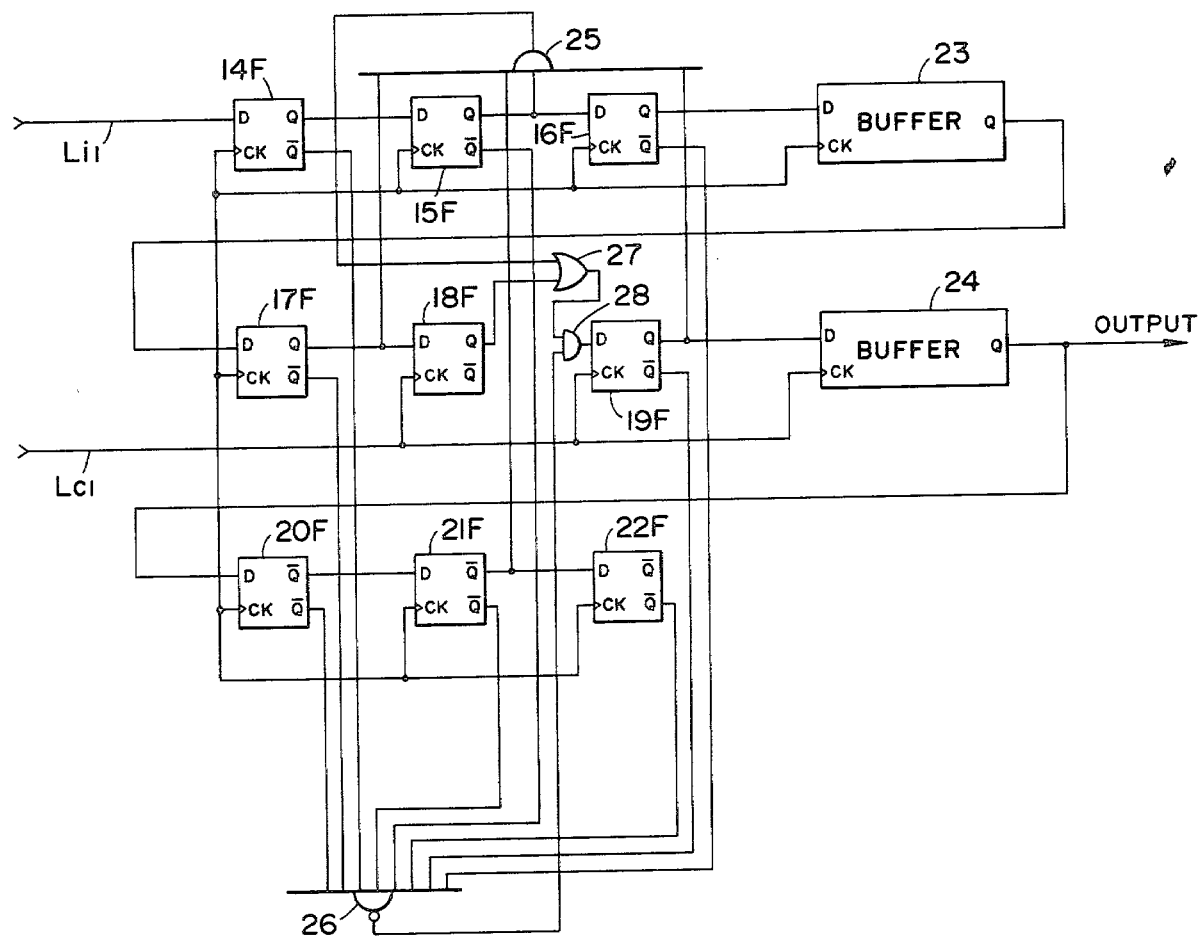
FIG. 5A is a schematic block diagram showing circuitry for eliminating isolated spots.

FIG. 5A shows the internal structure of spot eliminating circuit E1 which improves the signal compression ratio by eliminating noises consisting of isolated signal "0" or "1" from the binary image signals.

Figures 5B, 5C:
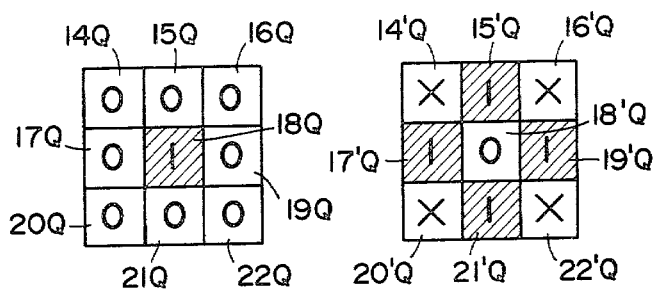
FIG. 5B is an enlarged view of a black isolated spot.
FIG. 5C is an enlarged view of a white isolated spot.

FIGS. 5A and 5B show the patterns of nine neighboring picture elements 14Q–22Q or 14'Q–22'Q which respectively correspond to the signals from the outputs Q of the flip-flops 14F–22F shown in FIG. 5A. It is assumed that the signals "0" and "1" respectively represent white and black picture elements. In FIG. 5B the isolated black picture element which is less than a predetermined length and corresponds to the signal "1" in the picture element 18Q can be eliminated by inverting signal "1" (black) to "0" (white). Similarly in FIG. 5C the isolated white picture element which is less than a predetermined length and corresponds to the signal "0" in the picture element 18'Q can be eliminated by inverting signal "0" (white) to "1" (black). The crosses "X" in FIG. 5C indicate that signals in these picture elements may be either "0" or "1". The circuit shown in FIG. 5A functions to eliminate the isolated spot in the information from the output Q of the flip-flop 18F as explained in the foregoing and to supply thus modified signals to the input D of the flip-flop 19F. In the circuit of FIG. 5A, the aforementioned binary image signals are entered bit by bit from an input line Li₁ in synchronism with the original scanning and are in succession transferred in the order of flip-flops 14F–16F, a buffer memory 23, flip-flops 17F–19F, a buffer memory 24 and flip-flops 20F–22F in response to the clock pulses supplied from a clock line Lc1. In this manner the binary image signals on the first scan line are stored in the flip-flops 22F, 21F and 20F and in the buffer memory 24, while the binary image signals on the second scan line are stored in the flip-flops 19F, 18F and 17F and in the buffer memory 23, and the first three binary image signals on the third scan line are stored in the flip-flops 16F, 15F and 14F. Thus buffer memories 23, 24, usually composed of shift registers, respectively have a memory capacity equal to the number of bits in a scan line minus three bits, thereby allowing to identify the inter-line correlation of the information consisting of three scan lines. Through the above-mentioned arrangement of the flip-flops 14F–22F and the buffer memories 23 and 24, flip-flops 14F–22F respectively correspond to the positions of the nine picture elements 14Q–22Q or 14'Q–22'Q shown in FIG. 5B or 5C. Now, taking the pattern shown in FIG. 5B or 5C as the original, the first scan line, which will hereinafter be called the preceding line, extends in the direction of arrow SL1, while the second scan line, which will hereinafter be called the subject line, extends in the direction of arrow SL2, and the third scan line, which will hereinafter be called the succeeding line, extends in the direction of arrow SL3.

In the circuit shown in FIG. 5A, the spot eliminating process is conducted at the flip-flop 18F, since the spot to be eliminated appears always in the central picture element in FIGS. 5B and 5C. In FIG. 5A, 25 and 28 are AND circuits, 26 in a NAND circuit, and 27 is an OR circuit. As the output ports Q of flip-flops 14F–17F and 19F–22F are connected to the NAND circuit 26, it gives an output "0" when the output ports $\overline{Q}$ of said flip-flops provide outputs "0", or namely when the output ports $\overline{Q}$ of the flip-flops provide outputs "1". In each flip-flop the input port D and the output port Q are always on a same signal level, while the output ports Q and $\overline{Q}$ are always on inverted signal levels. The AND circuit 28, of which an input port is connected to the output port of said NAND circuit 26, therefore gives an output "0" regardless of the output signal from the flip-flop 18F which is received at the other input port of said AND circuit 26 through the OR circuit 27. Upon an entry of the succeeding image signal through the input line Li₁ to the input port D of the flip-flop 14F and of a clock pulse from the clock line Lc1, the input port D of the flip-flop 18F receives the signal from the output port Q of the flip-flop 17F while the input port D of the flip-flop 19F receives the signal "0" regardless of the output from the flip-flop 18F. In this manner the signal transmission is achieved with the elimination of the isolated spot at the flip-flop 18F, or namely with the elimination of the isolated black spot "1" in FIG. 5B. Also as the output ports Q of the flip-flops 15F, 17F, 19F and 21F are connected to the AND circuit 25, it provides an output "1" when output ports Q provide output "1". Thus the OR circuit 27, of which an input port is connected to the output port of AND circuit 25, therefore gives an output "1" regardless of the output signal from the flip-flop 18F which is received at the other input port of OR circuit 27. Also as the output port $\overline{Q}$ of the flip-flops 15F, 17F, 19F and 21F are connected to the NAND circuit 26, it provides an output "1" when the output ports Q of the flip-flops provide output "0", namely when the output ports $\overline{Q}$ of the flip-flops provide output "1". The AND circuit 28, of which an input port is connected to the output port of NAND circuit 26 while the other input port is connected to the output port of OR circuit 27, always provides an output "1" regardless of the output from flip-flop 18F. Upon entry of the succeeding signal through the input line Li1 to the input port D of the flip-flop 14F and of a clock pulse through the clock line Lc1, the input port D of the flip-flop 18F receives the signal from the output port Q of the flip-flop 17F, while the input port D of the flip-flop 19F receives a signal "1" regardless of the output from the flip-flop 18F. In this manner the signal transmission is achieved with the elimination of the isolated spot at the flip-flop 18F, or namely with the elimination of the isolated white spot "0" in FIG. 5C.

Figure 6A:
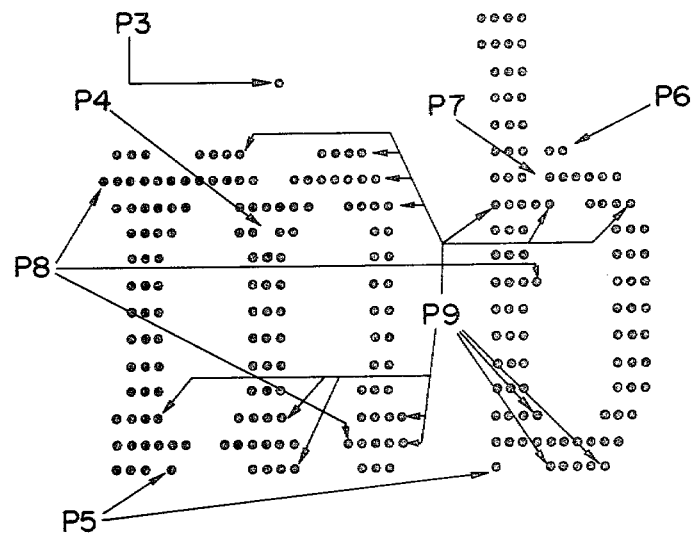
FIG. 6A is an enlarged view of a binary coded original pattern.
Figure 6B:
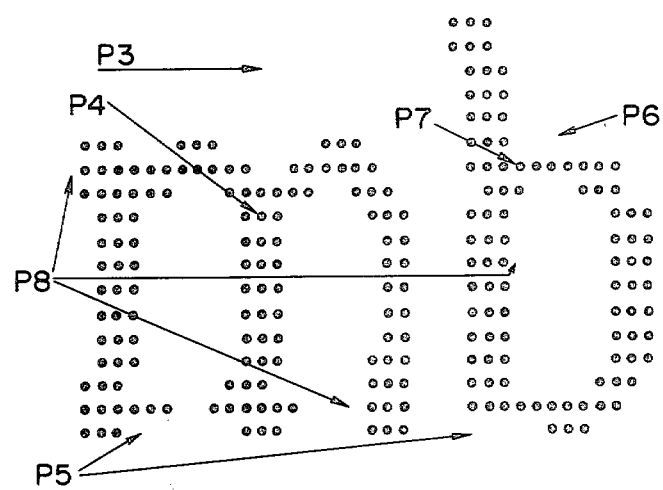
FIG. 6B is an enlarged view of the binary coded pattern after an image processing.

FIG. 6A shows in an enlarged view a binary coded original pattern of characters "mb". The above-explained spot elimination allows to remove noises from the image as shown in FIG. 6B, thus eliminating a black picture element in the area P3 and a white picture element in the area P4 as shown therein.

Figures 7, 7A:
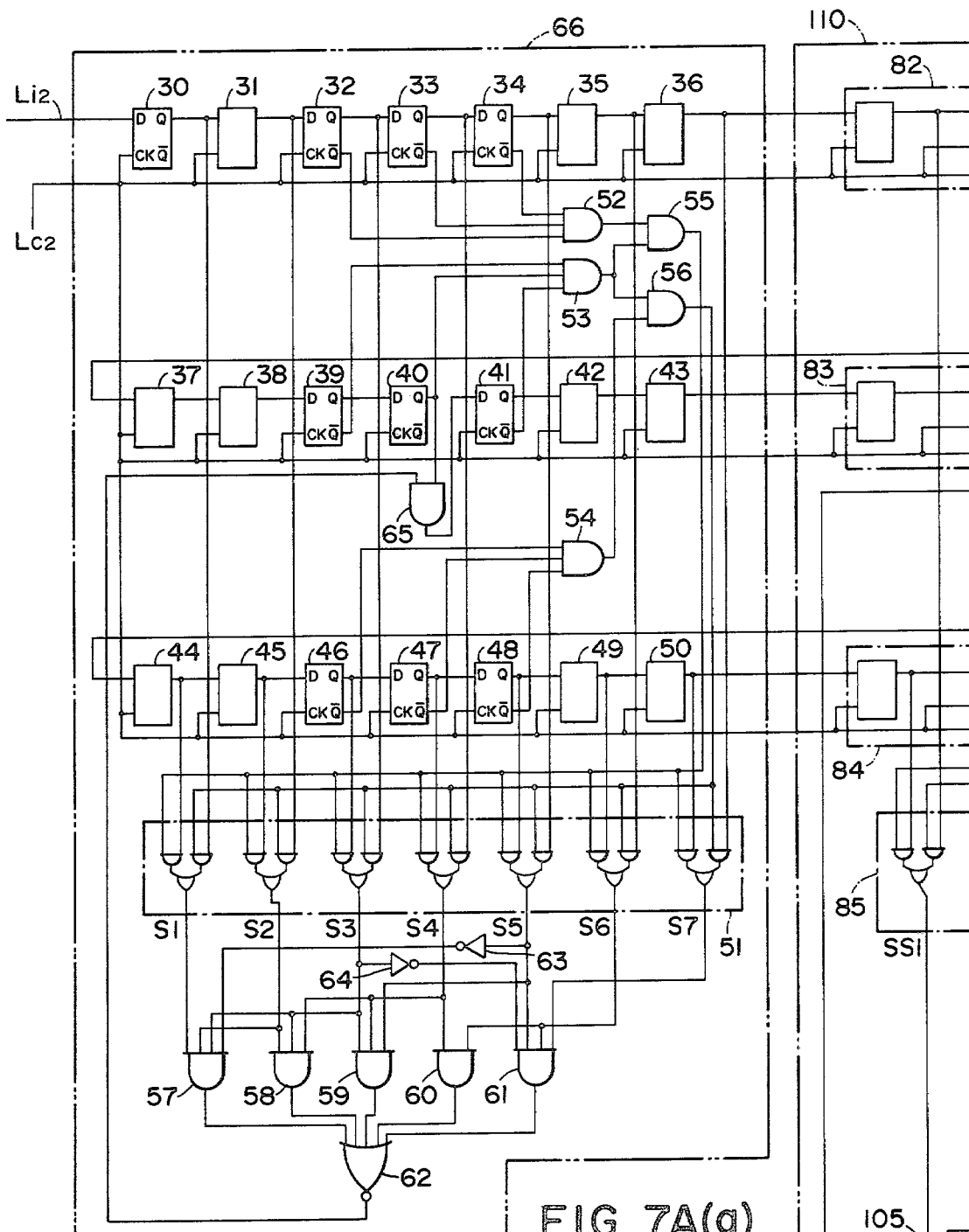
FIGS. 7A(*a*)–7A(*c*), when combined as shown in FIG. 7, are a circuit diagram showing an arrangement for smoothing process in the principal scanning direction.
Figure 7A:
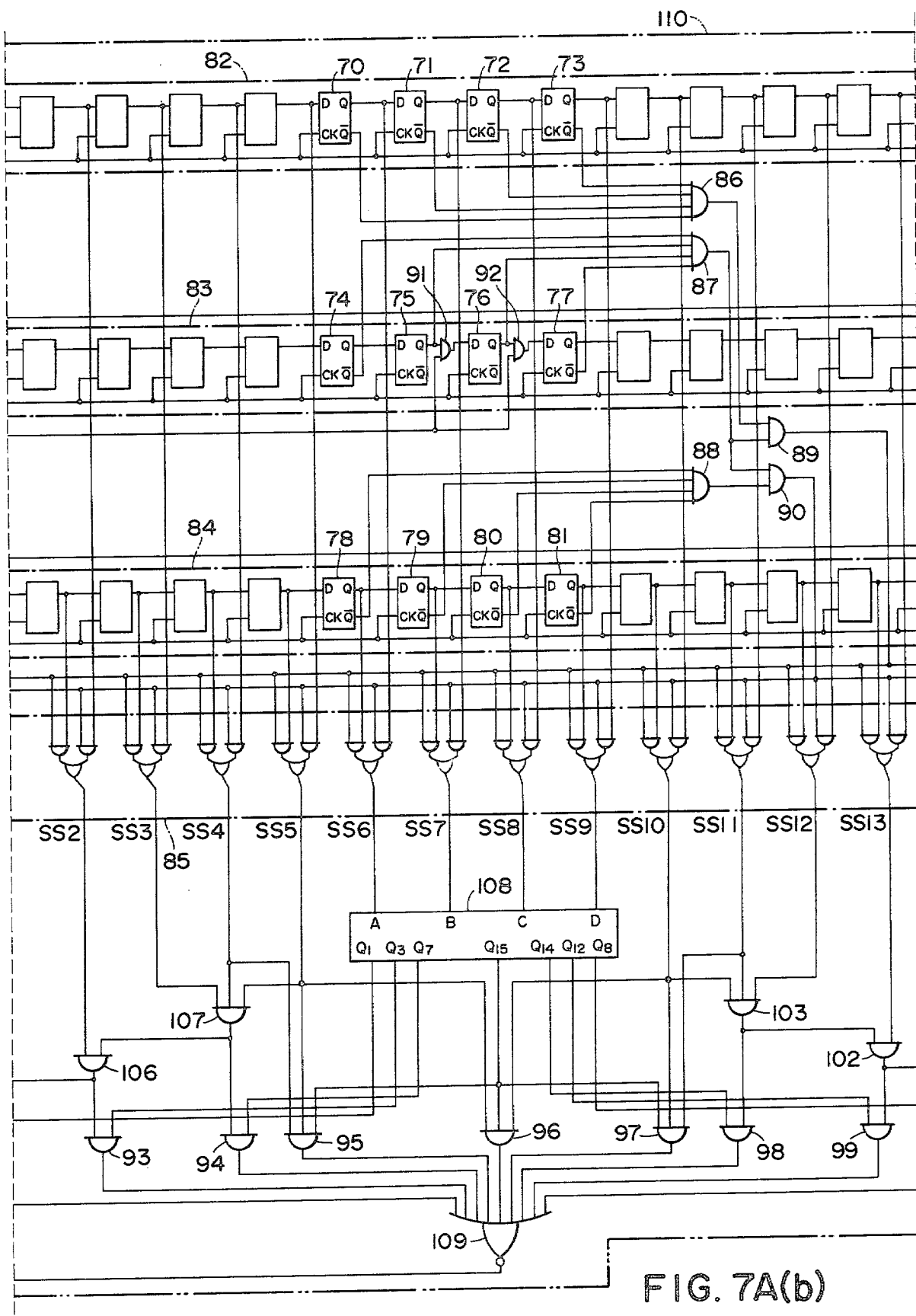
Figure 7A:
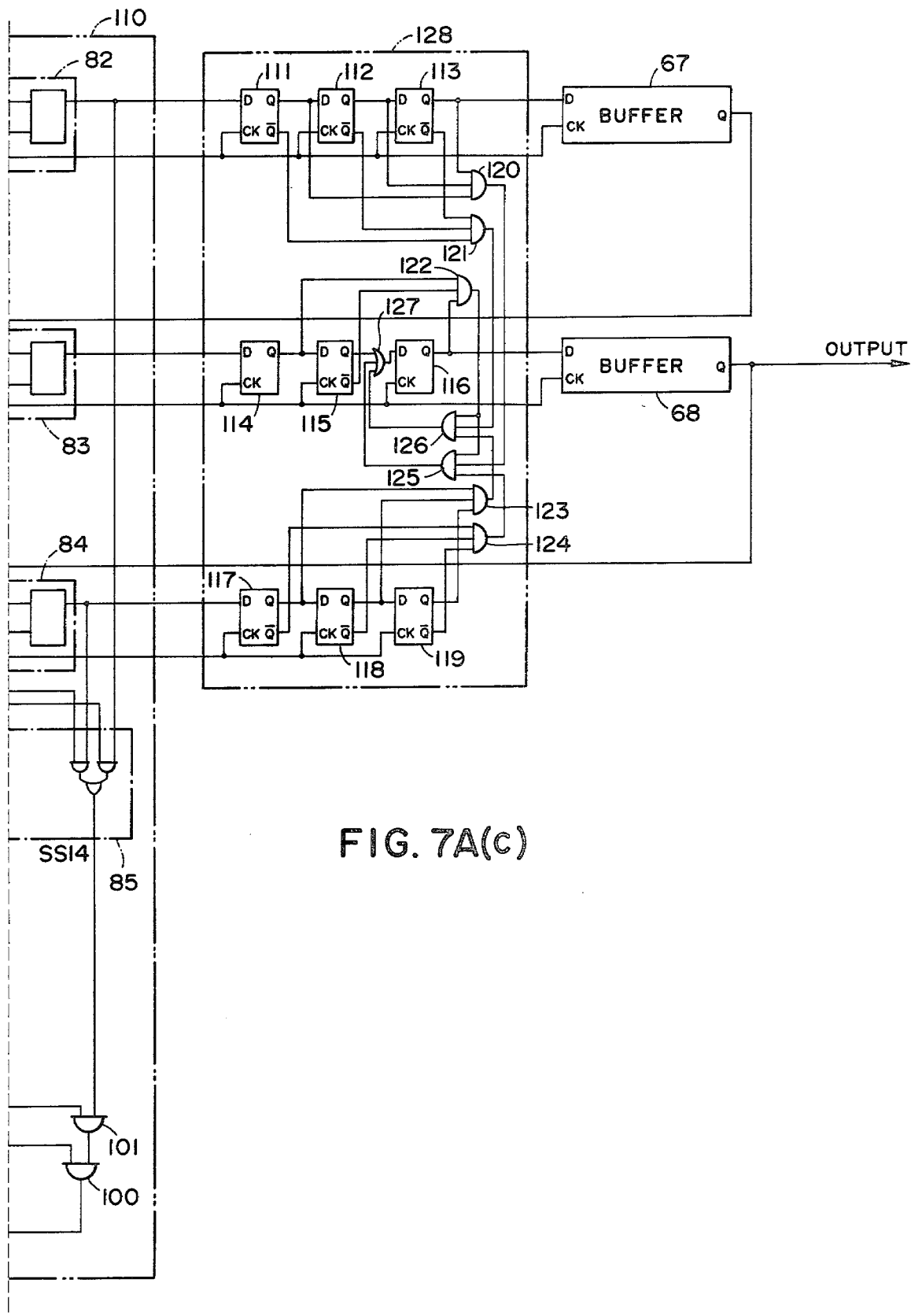

FIG. 7A shows the internal structure of the aforementioned smoothing circuit E2 shown in FIG. 2B, which improves the signal compression ratio by detecting and suppressing the change of signals "0" and "1" in the principal scanning direction as represented by the arrow SL1.

Figure 7B:
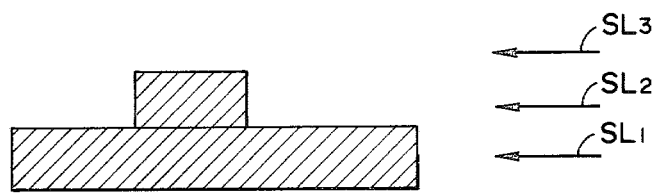
FIG. 7B is a view of a convexly contoured black image.
Figure 7C:
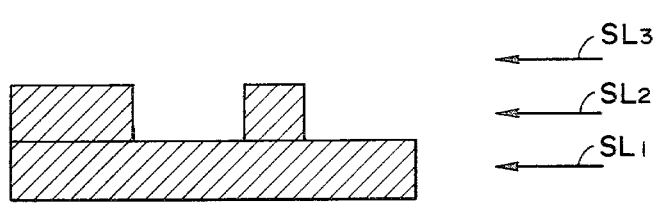
FIG. 7C is a view of a concavely contoured black image.

FIGS. 7B–7E show black image patterns having convex or concave portions directed upward or downward. Such convex or concave portions are smoothed by investigating the connection of black picture elements in the subject scan line (arrow SL2) with the black picture elements in the preceding scan line (arrow SL1) and with those in the succeeding line (arrow SL3), and by changing the black picture elements in the projecting portion on the subject scan line into the white picture elements in the case of a convex form as shown in FIG. 7B or by changing the white picture elements in the recessed portion on the subject scan line into the black picture elements in the case of a concave form as shown in FIG. 7C. In this manner it is rendered possible to suppress the unnecessary inversion of signals. The above-explained smoothing process is applied only when such a process is considered reasonable, according to the following criteria.

The conversion of the black picture elements in the projecting portion on the subject line into the white picture elements in the case of a convex black image as shown in FIG. 7B takes place upon satisfaction of the following three conditions:

(1) that the black picture elements on the subject line are not connected, vertically or diagonally, to black picture elements on the succeeding line;

(2) that the black picture elements on the subject line are connected vertically or diagonally to only one black image on the preceding line; and (3) that the number of the black picture elements in the subject line does not exceed a predetermined number of bits and that the ratio of the number of black picture elements on the subject line to that of black picture elements on the preceding line does not exceed a predetermined value.

Similarly the conversion of the white picture elements in the recessed portion on the subject line into black picture elements in the case of a concave black image as shown in FIG. 7C takes place upon satisfaction of the following three conditions:

(1) that the white picture elements on the subject line are not connected, vertically or diagonally, to the black picture elements in the succeeding line;

(2) that the white picture elements on the subject line and the black picture elements laterally adjacent thereto are connected, vertically at least by one element each, to only one black image on the preceding line; and (3) that the number of white picture elements on the subject line does not exceed a predetermined number of bits and that the ratio of the number of white picture elements on the subject line to that of black picture elements on the preceding line does not exceed a predetermined value.

It will be understood that similar processes are possible also when the preceding line and the succeeding line are inverted, by inverting the above-mentioned conditions for the preceding and succeeding lines.

The processes shown in FIGS. 7B-7E are conducted by the circuit blocks 66, 110 and 128 in FIG. 7A, and, for a convex black image, the circuit blocks 66 and 110 perform the conversion of the black picture elements on the subject line into white picture elements when the number of black picture elements on the subject line does not exceed 2 bits and does not exceed one third of the number of black picture elements on the preceding line. Also for a concave black image the circuit block 128 performs the conversion of the white picture element on the subject line into black image picture element when the number of the white picture elements on the subject line does not exceed one bit and the black picture elements on the preceding line are continued for at least three bits on the preceding line.

For a convex black image, the condition that the number of black picture elements on the subject line does not exceed two bits and does not exceed one third of the number of black picture elements on the preceding line is satisfied either when the subject line contains one black picture element and the preceding line contains three or more black picture elements, which is handled by the circuit block 66, or when the subject line contains two black picture elements and the preceding line contains six or more black picture elements, which case is handled by the circuit block 110. Now there will be explained the overall structure of the circuit shown in FIG. 7A before going into the details of the circuit blocks 66, 110 and 128.

In FIG. 7A, the binary image signals after being subjected to the spot elimination in the circuit of FIG. 5A are entered bit by bit through an input line Li2, and transferred, in response to the clock pulses supplied from a clock line Lc2, in the order of flip-flops 30-36, a flip-flop group 82, flip-flops 111-113, a buffer memory 67, flip-flops 37-43, a flip-flop group 83, flip-flops 114-116, a buffer memory 68, flip-flops 44-50, a flip-flop group 84 and flip-flops 117-119. Buffer memories 67 and 68 each have a memory capacity equal to the number of bits per line minus 24, and are connected in such a manner as to allow identification of the correlation of information in the aforementioned three lines as explained in connection with FIG. 5A. In this manner the aforementioned binary image signals are stored in various flip-flops in the circuit blocks 66, 110 and 128. The circuit block 66 performs the smoothing process in a convex black image as explained in the foregoing by eliminating a 1-bit signal "1" on the subject line.

Circuit block 66 is composed of flip-flops 30-50 each having an input port D at upper left, a clock input port CK at lower left, an output port Q at upper right and an inverted output port $\overline{Q}$ at lower right as particularly noted on the flip-flops 30, 32-34, 39-41 and 46-48 for the purpose of clarity, a data selecting circuit 51, AND gates 52-61 and 65, inverters 63 and 64, and a NOR gate 62. In a similar manner as explained in connection with FIG. 5A, the smoothing process is always conducted in the central picture element, of which information is stored in the flip-flop 40 in the circuit block 66 in FIG. 7A. The signals of the subject line are stored in the flip-flops 37-43, among which the flip-flops 39, 40 and 41 are connected respectively through the output ports $\overline{Q}$, Q and $\overline{Q}$ thereof to the input ports of the AND gate 53. Thus, when flip-flops 39, 40 and 41 respectively release output signals "0", "1" and "0" from the output ports Q thereof, the aforementioned output ports $\overline{Q}$, Q and $\overline{Q}$ of flip-flops all produce the output signals "1", whereby AND gate 53 develops an output signal "1".

The signals of the succeeding line are stored in the flip-flops 30-36, among which the flip-flops 32, 33 and 34 are connected respectively through the output ports $\overline{Q}$, $\overline{Q}$ and $\overline{Q}$ thereof to the input ports of the AND gate 52. Thus, when flip-flops 32, 33 and 34 respectively release output signals "0", "0" and "0" at the output ports Q thereof, the aforementioned output ports $\overline{Q}$, $\overline{Q}$ and $\overline{Q}$ of the flip-flops all release the output signals "1", whereby AND gate 52 releases an output signal "1".

The signals of the preceding line are stored in the flip-flops 44-50, among which the flip-flops 46, 47 and 48 are connected respectively through the output ports $\overline{Q}$, $\overline{Q}$ and $\overline{Q}$ thereof to the input ports of the AND gate 54. Thus, when flip-flops 46, 47 and 48 respectively produce output signals "0", "0" and "0" at the output ports Q thereof, the aforementioned output ports $\overline{Q}$, $\overline{Q}$ and $\overline{Q}$ of the flip-flops all release the output signals "1", whereby AND gate 54 releases an output signal "1". The outputs of AND gates 52 and 53 are supplied to the AND gate 55, while the outputs of AND gates 53 and 54 are supplied to the AND gate 56, and the outputs of AND gate 55 and 56 are supplied to the data selecting circuit 51, which is composed of a plurality of circuits each consisting of two AND gates and an OR gate receiving the outputs thereof, wherein the AND gates in each of the circuit respectively receive, at one input ports thereof, the outputs of aforementioned AND gates 55 and 56, and, at the other input ports thereof, the outputs of the ports Q of corresponding flip-flops in the above-mentioned succeeding line 30-36 and preceding line 44-50. The outputs of the OR circuits of the data selecting circuit 51 constitute the outputs S1-S7 thereof. In such a structure, when the outputs Q of the flip-flops 32, 33 and 34 in the succeeding line are respectively "0", "0" and "0" and those of the flip-flops 39, 40 and 41 in the subject line are respectively "0", "1" and "0", the AND circuit 55 releases an output "1" as explained in the foregoing, whereby the output ports S1-S7 of the data selecting circuit 51 develop the same information as that from the ports Q of the flip-flops 44-50 of the preceding line. On the other hand, when the outputs Q of the flip-flops 46, 47 and 48 in the preceding line are respectively "0", "0" and "0" and those of the flip-flops 39, 40 and 41 in the subject line are respectively "0", "1" and "0", the AND circuit 56 releases an output "1" as explained in the foregoing, whereby the output ports S1–S7 of the data selecting circuit 51 release the same information as that from the ports Q of the flip-flops 30–36 of the succeeding line. Also when the outputs of both AND gates 55 and 56 are "1", the output ports S1–S7 of the data selecting circuit 51 produce the logic sum of the outputs Q of the flip-flops 30–36 and those of the flip-flops 44–50. These various output signals from the data selecting circuit 51 are supplied, through the inverters 63 and 64, AND gates 57–61 and OR gate 62, to an input port of the AND gate 65 of which the other input port receives the output Q of the flip-flop 40, and the output of said AND gate 65 representing the logic product of the input signals is supplied to the input port D of the flip-flop 41. Thus, the smoothing process, wherein the port D of the flip-flop 41 receives a signal "0" despite that the port Q of the flip-flop 40 releases a signal "1", takes place for five cases of outputs from the ports S1–S7 of the data selecting circuit 51, as shown in cases I–V in the following Tab. 1, wherein the symbol "x" indicating that the signal may be either "0" or "1":

TABLE 1

| Case | S1 | S2 | S3 | S4 | S5 | S6 | S7 |
|---|---|---|---|---|---|---|---|
| I | x | x | 1 | 1 | 1 | x | x |
| II | 1 | 1 | 1 | x | 0 | x | x |
| III | x | 1 | 1 | 1 | x | x | x |
| IV | x | x | x | 1 | 1 | 1 | x |
| V | x | x | 0 | x | 1 | 1 | 1 |

In the case of the pattern shown in FIG. 6A, the above-mentioned smoothing process eliminates 1-bit black picture elements from two areas P5 as shown in FIG. 6B.

The circuit block 110 performs the smoothing in an aforementioned convex black image by eliminating 2-bit signal "1" on the subject line, and is composed of flip-flops 70–81, flip-flop groups 82–84, a data selecting circuit 85, AND gates 86–107, a 16-bit decoder 108, and a NOR circuit 109. In a similar manner as explained in connection with the circuit block 66, the smoothing process is conducted on the image information stored in the flip-flops 75 and 76 in the circuit block 110 shown in FIG. 7A. The signals of the subject line are stored in the flip-flop group 83, among which the flip-flops 74, 75, 76 and 77 are connected respectively through the output ports $\overline{Q}$, Q, Q and $\overline{Q}$ thereof to the input ports of the AND gate 87. Thus when flip-flops 74, 75, 76 and 77 respectively release output signals "0", "1", "1" and "0" at the output ports Q thereof, the aforementioned output ports $\overline{Q}$, Q, Q and $\overline{Q}$ of the flip-flops all release the output signals "1", whereby AND gate 87 releases an output signal "1".

The signals of the succeeding line are stored in the flip-flop group 82, among which the flip-flops 70, 71, 72 and 73 are connected respectively through the output ports $\overline{Q}$ thereof to the input ports of the AND gate 86. Thus when flip-flops 70, 71, 72 and 73 respectively release output signals "0" at the output ports Q thereof, the aforementioned output ports $\overline{Q}$ of the flip-flops all release the output signals "1", whereby AND gate 86 releases an output signal "1".

The signals of the preceding line are stored in the flip-flop group 84, among which the flip-flops 78, 79, 80 and 81 are connected respectively through the output ports $\overline{Q}$ thereof to the input ports of the AND gate 88. Thus when flip-flops 78, 79, 80 and 81 respectively release output signal "0" at the output ports Q thereof, the aforementioned output ports $\overline{Q}$ of the flip-flops all release the output signals "1", whereby AND gate 88 releases an output signal "1".

The outputs of AND gates 86 and 87 are supplied to the AND gate 89, while the outputs of AND gates 87 and 88 are supplied to the AND gate 90, and the outputs of AND gates 89 and 90 are supplied to the data selecting circuit 85, which is composed of a plurality of circuits each consisting of two AND gates and an OR gate receiving the outputs thereof, wherein the AND gates in each of the circuit respectively receive, at one input ports thereof, the outputs of aforementioned AND gates 89 and 90, and, at the other input ports thereof, the outputs of the ports Q of the corresponding flip-flops in the above-mentioned flip-flop group 82 for the succeeding line and the group 84 for the preceding line. The outputs from the OR gates of the data selecting circuit 85 constitute the outputs SS1–SS14 thereof. In such a structure, when the outputs Q of the flip-flops 70, 71, 72 and 73 for the succeeding line are respectively "0", "0", "0" and "0" and those of the flip-flops 74, 75, 76 and 77 for the subject line are respectively "0", "1", "1" and "0", the AND gate 89 releases an output "1" as explained in the foregoing, whereby the output ports SS1–SS14 of the data selecting circuit 85 provide the same information as that from the ports Q of the flip-flop group 84 for the preceding line. On the other hand, when the outputs Q of the flip-flops 78, 79, 80 and 81 for the preceding line are respectively "0", "0", "0" and "0" and those of the flip-flops 74, 75, 76 and 77 for the subject line are respectively "0", "1", "1" and "0", the AND gate 90 releases an output "1" as explained in the foregoing, whereby the output ports SS1–SS14 of the data selecting circuit 85 provide the same information as that from the ports Q of the flip-flop group 82 for the succeeding line. Also when the outputs of AND gates 89 and 90 are both "1", the output ports SS1–SS14 of the data selecting circuit 85 produce the logic sum of the outputs Q of the flip-flop group 82 and those of the flip-flop group 84. These various output signals from the data selecting circuit 85 are supplied, through the 16-bit decoder 108, AND gates 93–107 and NOR gate 109, to input ports of the AND gates 91 and 92, of which the other input ports are respectively connected to the ports Q of the flip-flops 75 and 76, and the outputs of AND gates 91 and 92 representing the logic products of the input signals are respectively supplied to the input ports D of the flip-flops 76 and 77. Thus, the smoothing process, wherein the ports D of the flip-flops 76 and 77 receive signals "0" despite that the output ports Q of the flip-flops 75 and 76 release signals "1", takes place in nine cases of output from the ports SS1–SS14 of the data selecting circuit 85, as shown in cases I–IX in the following Tab. 2, wherein the symbol "x" indicating that the signal may be either "0" or "1":

TABLE 2

| Case | SS1 | SS2 | SS3 | SS4 | SS5 | SS6 | SS7 | SS8 | SS9 | SS10 | SS11 | SS12 | SS13 | SS14 |
|---|---|---|---|---|---|---|---|---|---|---|---|---|---|---|
| I | x | x | x | x | x | 0 | 0 | 0 | 1 | 1 | 1 | 1 | 1 | 1 |
| II | x | x | x | x | x | 0 | 0 | 1 | 1 | 1 | 1 | 1 | 1 | x |
| III | x | x | x | x | x | 0 | 1 | 1 | 1 | 1 | 1 | 1 | x | x |

TABLE 2-continued

| Case | SS1 | SS2 | SS3 | SS4 | SS5 | SS6 | SS7 | SS8 | SS9 | SS10 | SS11 | SS12 | SS13 | SS14 |
|------|-----|-----|-----|-----|-----|-----|-----|-----|-----|------|------|------|------|------|
| IV   |     |     |     | 1   | 1   | 1   | 0   | 0   | 0   | x    | x    | x    | x    | x    |
| V    | 1   |     |     | 1   | 1   | 1   | 1   | 1   | 0   | x    | x    | x    | x    | x    |
| VI   | 1   |     |     | 1   | 1   | 1   | 1   |     | 0   | x    | x    | x    | x    | x    |
| VII  | 1   |     | x   | x   | 1   | 1   |     | 1   |     | 1    | 1    | x    | x    | x    |
| VIII | 1   |     | x   | 1   | 1   | 1   |     |     |     | 1    | x    | x    | x    | x    |
| IX   | 1   |     |     | 1   | 1   | 1   | 1   |     |     | x    | x    | x    | x    | x    |

In the case of the pattern shown in FIG. 6A, the above-mentioned smoothing process eliminates 2-bit black picture elements from the area P6 as shown in FIG. 6B.

Figures 7D, 7E:
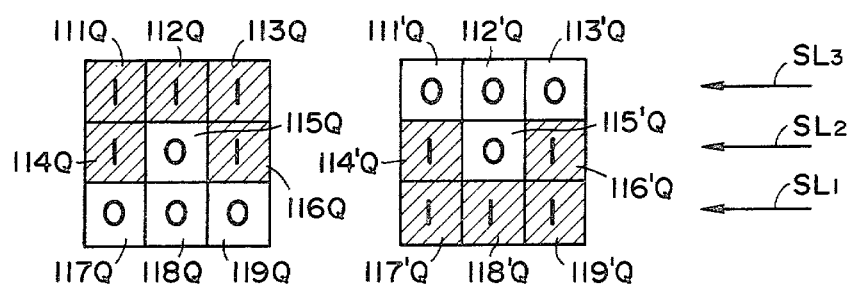
FIG. 7D is an enlarged view of a downward concave balck image.
FIG. 7E is an enlarged view of an upward concave black image.

The circuit block 128 performs the smoothing in an aforementioned concave black image by eliminating 1-bit signal "0" on the subject line, and is composed of flip-flops 111–119, AND gates 120–126 and an OR gate 127, wherein said flip-flops 111–119 respectively corresponding to nine picture elements 111Q–119Q or 111′Q–119′Q shown in FIG. 7D or 7E, and "1" and "0" representing the signals from the ports Q of said flip-flops 111–119 in a similar manner as already discussed in connection with FIGS. 5A–5C. Thus the smoothing process is conducted on the information stored in the flip-flop 115 in the circuit block 128 shown in FIG. 7A. The signals of the subject line are stored in the flip-flops 114, 115 and 116 which are connected respectively through the output ports Q, $\bar{Q}$ and Q thereof to the input ports of the AND gate 122. Thus, when flip-flops 114, 115 and 116 respectively release output signals "1", "0" and "1" at the output ports Q thereof, the aforementioned output ports Q, $\bar{Q}$ and Q of the flip-flops all release the output signals "1", whereby AND gate 122 releases an output signal "1".

The signals of the succeeding signals are stored in the flip-flops 111, 112, and 113 which are connected respectively through the output ports Q thereof to the input ports of the AND gate 120 and through the output ports $\bar{Q}$ thereof to the input ports of the AND gate 121. Thus the AND gates 120 and 121 respectively release signals "0" and "1" when the ports Q of said flip-flops 111, 112 and 113 all release the signal "0", and the AND gates 120 and 121 respectively release signals "1" and "0" when ports Q all develop the signals "1".

The signals of the preceding line are stored in the flip-flops 117, 118 and 119 which are connected respectively through the output ports Q thereof to the input ports of the AND gate 123 and through the output ports $\bar{Q}$ thereof to the input ports of the AND gate 124. Thus the AND gates 123 and 124 respectively release signals "0" and "1" when the ports Q of said flip-flops 117, 118 and 119 all release the signals "0", and the AND gates 123 and 124 respectively release signals "0" and "1" when ports Q all release the signals "0". The outputs from the AND gates 121, 122 and 123 are supplied to the AND gate 126, while the outputs from the AND gates 120, 122 and 124 are supplied to the AND gate 125, and the outputs from AND gates 125 and 126 and the output Q from the flip-flop 115 are supplied to the OR circuit 127 of which output is supplied to the input port D of the flip-flop 116. Thus, a signal arrangement as shown in FIG. 7D provides an output "1" from the AND gate 125, whereby the OR circuit 127 provides an output "1" regardless of the output from the flip-flop 115. Therefore the input port D of the flip-flop 116 receives a signal "1" as explained in the foregoing, whereby the signal "0" (white) in the picture element 115Q in FIG. 7D is changed to "1" (black) to achieve smoothing of a downwardly concave black image.

Also a signal arrangement as shown in FIG. 7E provide an output "1" from the AND gate 126, whereby the OR circuit 127 provides an output "1" regardless of the output from the flip-flop 115. Therefore the input port D of the flip-flop 116 receives a signal "1" as explained in the foregoing, whereby the signal "0" (white) in the picture element 115′Q in FIG. 7E is changed to "1" (black) to achieve smoothing of an upwardly concave black image.

The above-explained smoothing process adds a 1-bit black picture element in the portion P7 as compared in FIGS. 6A and 6B. Thus, as explained in the foregoing, the circuit of FIG. 7A suppresses the signal inversion in the direction of principal or main scanning direction.

Figure 8A:
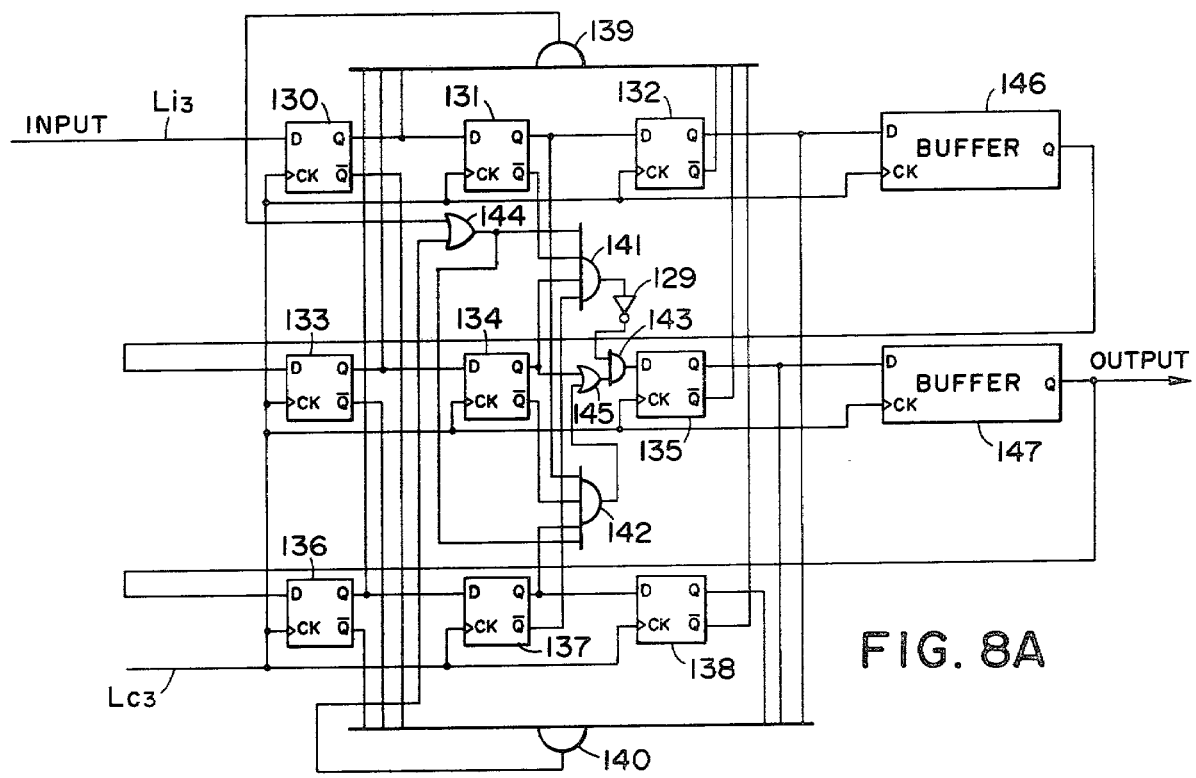
FIG. 8A is a schematic block diagram showing an arrangement for smoothing process in the auxiliary scanning direction.

FIG. 8A shows the structure of the aforementioned smoothing circuit E3 (see FIG. 2B) which detects the changes of signals "0" and "1" in the aforementioned auxiliary scanning or subscanning direction which is substantially perpendicular to the arrow SL1 and improves the signal compression rate by suppressing the signal changes. FIGS. 8B–8F illustrate various examples of black images having irregularities on lateral ends thereof. The above-mentioned circuit performs smoothing by chacking the connection of black picture elements on the subject line (indicated by the arrow SL2) with those on the preceding line (indicated by the arrow SL1) and on the succeeding line (indicated by the arrow SL3) and by aligning the protruding or recessed end portions of the black image on the subject line with the end portions of the black images on the preceding or succeeding line. This smoothing process is conducted only when it is considered practically reasonable according to the following criteria.

Figure 8B:
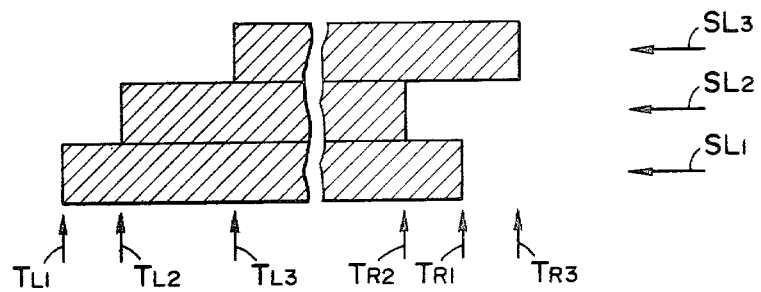
FIG. 8B is a view showing the left-hand end and the right-hand end of a black image.
Figures 8C, 8D:
FIG. 8C is an enlarged view showing a black image convex to the right.
FIG. 8D is an enlarged view of a black image concave to the right.
Figures 8E, 8F:
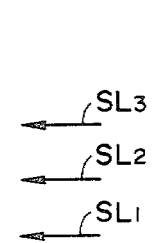
FIG. 8E is an enlarged view of a black image convex to the left.
FIG. 8F is an enlarged view of a black image concave to the left.

Referring to FIG. 8B, the left-end positions of the black images on the succeeding, subject and preceding lines are respectively defined as TL3, TL2 and TL1, and the right-end positions of the black images on the three lines are respectively defined as TR3, TR2 and TR1. The above-mentioned change of the end positions of the black image on the subject line is conducted on the condition, at the left-end portion, that the black images are vertically connected across the succeeding, subject and preceding lines (hereinafter collectively called "three lines") at the most right position (TL3 in this case) of said three left-end positions and are continuous to other two left-end positions TL1 and TL2 on respective lines, and, at the right-end portion, that the black images are vertically connected across the three lines at the most left position (TR2 in this case) of the three right-end positions and are continuous to other two right-end positions TR1 and TR3 on respective lines.

For the purpose of clarity, the absolute value or magnitude of the distance between the image end positions on the succeeding and preceding lines, i.e. TL3-TL1 or TR3-TR1 is defined as T1, the absolute value of the distance between the image end positions on the subject and succeeding lines, i.e. TL2-TL3 or TR2-TR3 is defined as T23, and the absolute value of the distance between the image end positions on the subject and preceding lines, i.e. TL2-TL1 or TR2-TR1 is defined as T21.

Further referring to FIG. 8B, and at the left-end portion thereof, the distance of the image end position on the subject line from the one at right of the image end positions on other two lines is defined as T2 (equal to T23 in this case) which is defined positive or negative respectively when the image end position on the subject line is located at left or at right. At the right-end portion, the distance of the image end position on the subject line from the one at left of the image end positions on other two lines is defined as T2 (equal to T21 in this case) which is defined positive or negative respectively when the image end position on the subject line located at right or at left. In the illustrated example in FIG. 8B, T2>0 at the left end position and T2<0 at the right.

The conditions of smoothing process will be discussed in the following, utilizing T1 and T2 defined above:

(A) In case T1≠0;
(a) if T2<0, black picture elements are added at the left-end portion (or right-end portion; hereinafter parentheses referring to the right-end portion) to the image end on the subject line in such a manner that the image end becomes aligned with the one at right (or at left) of the image ends on the succeeding and preceding lines:
(b) if 0<T2≦¼T1, black picture elements are deleted at the left-end portion (or right-end portion) from the image end on the subject line in such a manner that the image end becomes aligned with the one at right (or at left) of the image ends on the succeeding and preceding lines:
(c) if ¼T1<T2<¾T1, no change is made at the image end on the subject line:
(d) if ¾T1≦T2<T1, black picture elements are added at the left-end portion (or right-end portion) to the image end on the subject line in such a manner that the image end becomes aligned with the one at left (or at right) of the image ends on the succeeding and preceding lines:
(e) if T1<T2, black picture elements are deleted at the left-end portion (or right-end portion) from the image end on the subject line in such a manner that the image end becomes aligned with the one at left (or at right) of the image ends on the succeeding and preceding lines:
(f) if T1=T2=0, no change is made on the image end on the subject line.

(B) In case T1=0;
(a) if T2<0, black picture elements are added to the image end on the subject line in such a manner that T2 becomes 0;
(b) if T2>0, black picture elements are deleted from the image end on the subject line in such a manner that T2 becomes 0;
(c) if T2=0, no change is made on the image end on the subject line.

The circuit shown in FIG. 8A is structured to achieve smoothing on the patterns shown in FIGS. 8C-8F, namely in the cases of T1=0, T2≦1 in the foregoing explanation.

Figure 1:
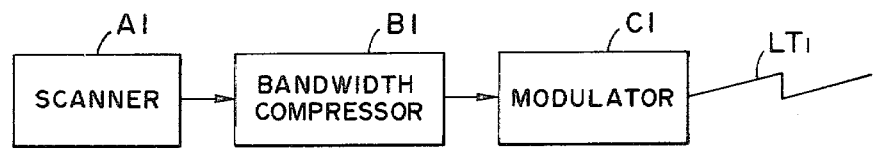
FIG. 1 is a schematic block diagram of a conventional information processing apparatus.

In FIG. 8A, the binary image signals after being subjected to the smoothing process in the principal scanning direction by the circuit of FIG. 7A are entered bit by bit through an input line Li3 and transferred, in response to the clock pulses supplied from a clock line Lc3, in the order of flip-flops 130-132, a buffer memory 146, flip-flops 133-135, a buffer memory 147 and flip-flops 136-138, wherein buffer memories 146 and 147 respectively have a memory capacity equal to the number of bits per line minus 3 and are connected in such a manner as to allow identification of the correlation of information stored in the aforementioned three lines as explained in connection with FIG. 5A. Because of the above-mentioned structure, the flip-flops 130-138 respectively correspond to nine picture elements shown in FIG. 8C-8F. Thus, in the case of the pattern the flip-flops 130-138 respectively store the signals 1, 0, 0, 1, 1, 0, 1, 0 and 0 (which are obtainable from the output ports Q thereof, whereas the output ports $\overline{Q}$ thereof release inverted signals 0, 1, 1, 0, 0, 1, 0, 1 and 1). Similarly said flip-flops 130-138 store the signals 1, 1, 0, 1, 0, 0, 1, 1 and 0 for the pattern of FIG. 8D, 0, 0, 1, 0, 1, 1, 0, 0 and 1 for the pattern of FIG. 8E, and 0, 1, 1, 0, 0, 1, 0, 1 and 1 for the pattern of FIG. 8F. The smoothing is conducted on the information stored in the flip-flop 134 in the circuit of FIG. 8A, which further comprises AND gates 139-143, OR gates 144 and 145 and an inverter 129. The output ports Q of the flip-flops 130, 133 and 136 and the output ports $\overline{Q}$ of the flip-flops 132, 135 and 138 are connected to the input ports of the AND gate 139, which therefore releases an output signal "1" for the patterns of FIGS. 8C and 8D. The output ports $\overline{Q}$ of the flip-flops 130, 133 and 136 and the output ports Q of the flip-flops 132, 135 and 138 are connected to the input ports of the AND gate 140, which therefore releases an output signal "1" for the patterns of FIGS. 8E and 8F. The outputs of said AND gates 139 and 140 are supplied to the OR gate 144, which therefore releases an output signal "1" for the patterns of FIGS. 8C-8F. The AND gate 141, receiving the outputs from OR gate 144 and from the output ports $\overline{Q}$, Q and $\overline{Q}$ respectively of the flip-flops 131, 134 and 137, releases an output signal "1" for the patterns of FIGS. 8C and 8E. Also the AND gate 142, receiving the outputs from OR gate 144 and from the output ports Q, $\overline{Q}$ and Q respectively of the flip-flops 131, 134 and 137, releases an output signal "1" for the patterns of FIGS. 8D and 8F. The AND gate 143, receiving the output of AND gate 141 through the inverter 129, releases an output signal "0" for the patterns of FIGS. 8C and 8E, since an input to AND gate 141 becomes zero in such a state. The flip-flop 135, receiving at the input port D thereof the output of AND gate 143 in the above-explained manner, memorizes the signal "0" regardless of the output of the flip-flop 135, whereby the smoothing is achieved by deletion of 1-bit black picture element. The AND gate 143, receiving at the other input port thereof the output of the OR gate 145 which in turn receives the output Q of the flip-flop 134 and the output of said AND gate 142, releases an output signal "1" for the patterns of FIGS. 8D and 8F. This signal "1" is supplied to the flip-flop 135 regardless of the output of the flip-flop 134, thereby achieving the smoothing by adding 1-bit black picture element.

The above-explained smoothing processes performs deletion of 1-bit black picture element in three portions P8 from the pattern shown in FIG. 6A, the result of the deletion being apparent from FIG. 6B. As explained in the foregoing, the circuit of FIG. 8A is capable of suppessing the inversion of signals in the aforementioned auxiliary scanning direction.

In the circuit block 110 in FIG. 7A, the number of flip-flops contained in the flip-flop groups 82-84 may be increased or decreased according to the necessity. Also the flip-flops 14F-22F in FIG. 5A, those 30-50 and 111-119 in FIG. 7A and those 130-138 in FIG. 8A may be incorporated in a part of the flip-flop groups 82-84 other than the flip-flops 70-81 in FIG. 7A. In this manner it is rendered possible to dispense with the buffer memories 23, 24, 146 and 147 and thus to further simplify the circuit structure.

The binary image signals subjected to the preprocesses explained in the foregoing are composed of signals of various run-lengths corresponding to the original information. For example in FIG. 8F, the information on the preceding line in the direction of arrow SL1 is 1, 1, 0 which is composed of a black run of 2-bit run-length and a white run of 1-bit run-length. Also the information on the subject line in the direction of arrow SL2, is 1, 0, 0 which is composed of a black run of 1-bit run-length and a white run of 2-bit run-length.

The above-mentioned black run-length will be discussed more detailedly in the following in relation to the following Tab. 3.

TABLE 3

| Column 1 Occurrences Black run length | Column 2 Original | Column 3 Ternary selective thinning process | Column 4 Unitary selective thinning process | Column 5 Odd number process |
| --- | --- | --- | --- | --- |
| 1 | 19 | 219 | 219 | 574 |
| 2 | 355 | 1355 | 1355 | 1 |
| 3 | 148 | 6032 | 9411 | 5107 |
| 4 | 159 | 0 | 0 | 1 |
| 5 | 15 | 0 | 0 | 514 |
| 6 | 29 | 1622 | 0 | 1 |
| 7 | 40 | 0 | 0 | 033 |
| 8 | 13 | 0 | 0 | 1 |
| 9 | 67 | 1757 | 0 | 340 |
| 10 | 23 | 0 | 0 | 1 |
| 11 | 7 | 0 | 0 | 20 |
| 12 | 3 | 303 | 303 | 1 |
| 13 | 18 | 218 | 218 | 138 |
| 14 | 7 | 70 | 70 | 1 |
| 15 | | 41 | 41 | 0 |
| 16 | 4 | 49 | 49 | 1 |
| 17 | | 16 | 16 | 2 |
| 18 | 3 | 16 | 16 | 1 |
| 19 | 3 | 10 | 10 | 4 |
| 20 | 4 | 14 | 14 | 1 |
| 21 | | | | |
| 22 | | 5 | 5 | |
| 23 | | 6 | 6 | 0 |
| 24 | | 4 | 4 | 1 |
| 25 | | 6 | 6 | |
| 26 | | 1 | 1 | |
| 27 | | 5 | 5 | 2 |
| 28 | | 7 | | 1 |
| 29 | | 11 | 11 | 9 |
| 30 | | 3 | 3 | 1 |
| 31 | | 6 | 6 | 1 |
| 32 | | 5 | 5 | 1 |
| 33 | | 6 | 6 | 1 |
| 34 | | 5 | 5 | 1 |
| 35 | 1 | 10 | 10 | 4 |
| 36 | | 4 | 4 | 1 |
| 37 | | 5 | 5 | 1 |
| 38 | | 3 | 3 | 1 |
| 39 | | 7 | | 0 |
| 40 | | 3 | 3 | 1 |
| 41 | | 2 | 2 | |
| 42 | | 1 | 1 | |
| 43 | | 1 | 1 | |
| 44 | | 1 | 1 | 1 |
| 45 | | 3 | 3 | |
| 48 | 2 | 2 | 2 | 0 |
| 51 | 1 | 1 | 1 | 2 |
| 53 | 1 | 1 | 1 | 0 |
| 70 | 1 | 1 | 1 | 2 |
| 76 | 1 | 1 | 1 | 0 |
| 2048 | 0 | 0 | 0 | 0 |

Figure 9A:
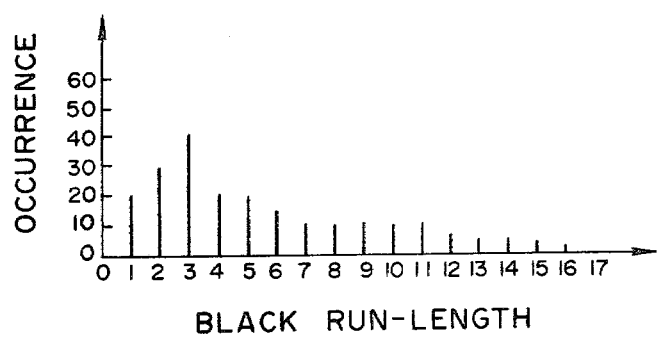
FIG. 9A is a chart plotting the number of occurrences of black run-lengths in an original.

The column 1 of Tab. 3 shows the black run-lengths expressed in the number of bits, and the column 2 shows the number of occurrences of each black run-length in binary image signals obtained by scanning an ordinary original. It will be observed that the black runs appear continuously in the range of run-length from 1 to 76. This situation is graphically represented in FIG. 9A which shows the frequency of occurrences in the ordinate as a function of black run-length in the abscissa.

However, such binary image signals containing continuously variable black run-lengths, if simply coded, will require a long transmission time.

The odd number process shown in the column 5 is capable of compressing the information and thus reducing the transmission time. This is a thinning process in which the black runs of a run-length of an even bit number are added to those of a run-length shorter by one bit before coding, so that the black run-lengths vary always by the multiples of two. Similarly it is also possible to modify the black run-lengths in such a manner that they always vary by the multiples of three or four and to utilize such modified black run-lengths for coding. In general, however, the image quality has to be sacrificed for a higher compression rate, or vice versa, in such a process. Therefore, in order to improve the compression rate while limiting the deterioration in image quality it is necessary to employ not a uniform thinning process as shown in column 5 but a thinning that will minimize the change in black run-length resulting from the thinning, and to allot as short codes as possible to the black runs occurring frequently after such thinning.

The selective thinning processes as shown in the column 3 or 4 of Tab. 3 allow to achieve high compression ratios, without substantial deterioration of the image quality.

Figure 9B:
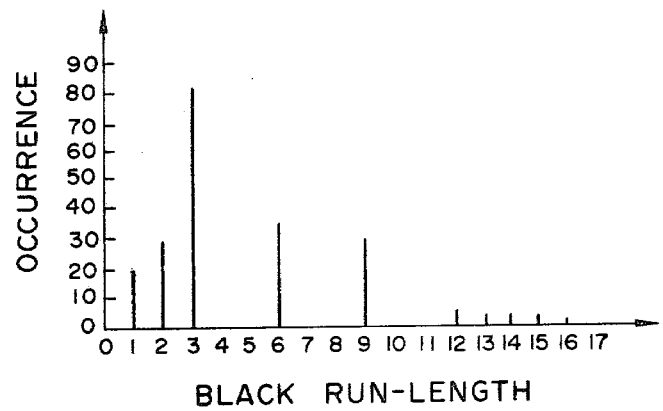
FIG. 9B is a chart plotting the number of occurrences of black run-lengths after a ternary selective thinning process.

In the thinning process shown in column 3, the black runs of 1 or 2 bits are not changed, while the black runs within a range from 3 to 5 bits are united to those of a determined length of 3 bits (3148+1959+925 =6032), the black runs within another range from 6 to 8 bits are united to those of a determined length of 6 bits (589+440+593=1622), and the black runs within still another range from 9 to 11 bits are united to those of a determined length of 9 bits (687+653+417=1757), while the black runs of 12 to 76 bits are not changed. This situation is graphically shown in FIG. 9B.

The above-explained process is called ternary selective thinning as the grouping is carried out in three ranges.

On the other hand, in the thinning process shown in the column 4 of Tab. 3, the black runs of 1 or 2 bits are not changed, while the black runs within a range from 3 to 11 bits are grouped to those of 3 bits (3148+1959+925+589+440+593+687+653+417-

Figure 9C:
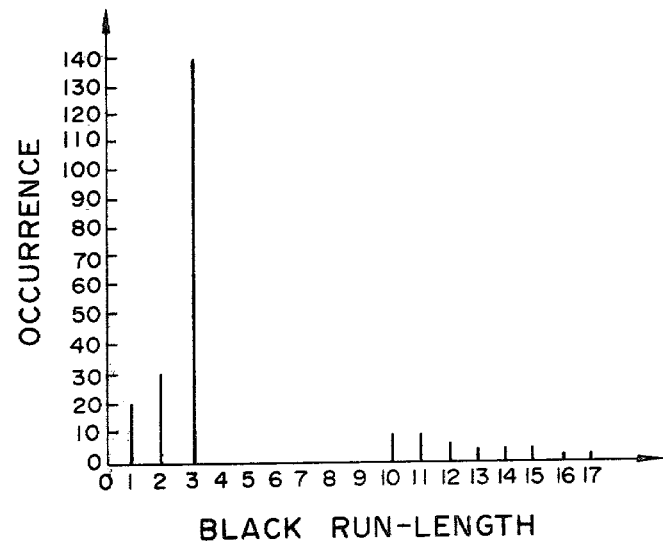
FIG. 9C is a chart plotting the number of occurrences of black run-lengths after a unitary selective thinning process.

=9411), and the black runs of 12 to 76 bits are not changed. This situation is graphically shown in FIG. 9C. This process is called unitary selective thinning as the grouping is carried out in one range. The unitary process is superior in the compression efficiency while the ternary process is superior in preventing the deterioration of image quality.

Figure 10A:
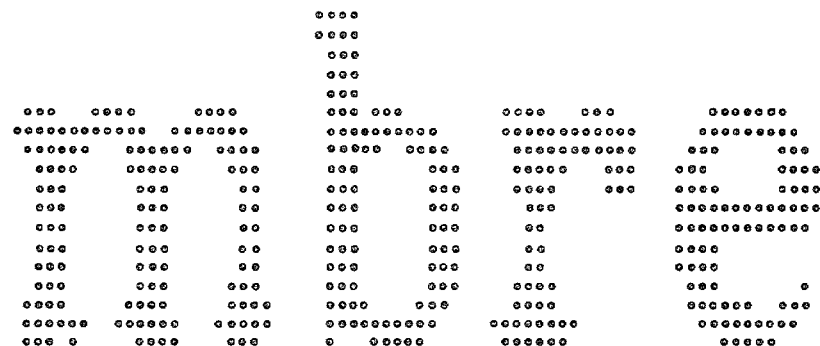
FIG. 10A is an enlarged view of a binary coded original pattern.
Figure 10B:
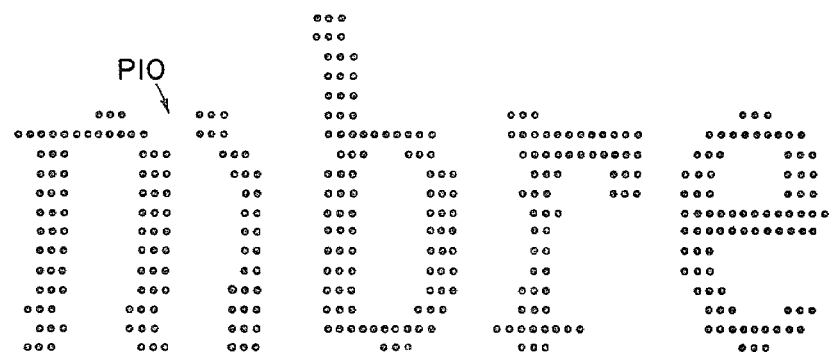
FIG. 10B is an enlarged view of the binary coded pattern after a pre-processing followed by a unitary selective thinning process.
Figure 10C:
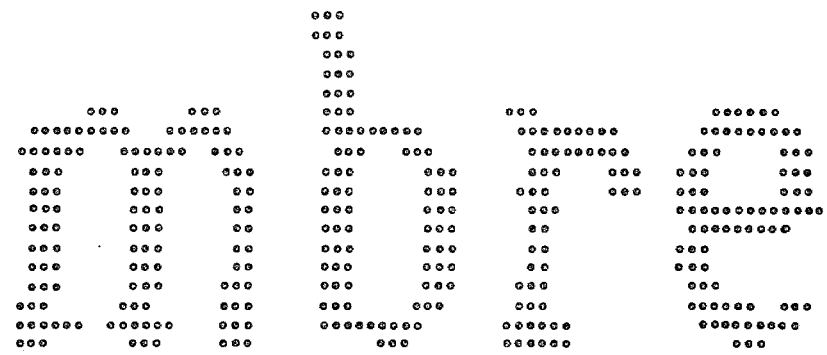
FIG. 10C is an enlarged view of the binary coded pattern after pre-processing followed by a ternary selective thinning process.

The image quality deterioration is compared in FIGS. 10A–10C and 11A–11C, FIGS. 10A and 11A are enlarged views of binary coded original patterns respectively of letters "mbre" and "fo" which are subjected, after pre-process such as aforementioned spot elimination and smoothing, to the unitary selective thinning or the ternary selective thinning, of which results are respectively shown in FIGS. 10B and 11B or in FIGS. 10C and 10C. It will be seen from the comparison of FIGS. 10B and 11C that the letter "m" lacks the portion P10 in the unitary thinning, and from the comparison of FIGS. 11B and 11C that the letter "f" lacks the portion P11 (horizontal bar) in the unitary thinning. In this manner it will be understood that the ternary thinning provides a superior image quality.

Figure 12:
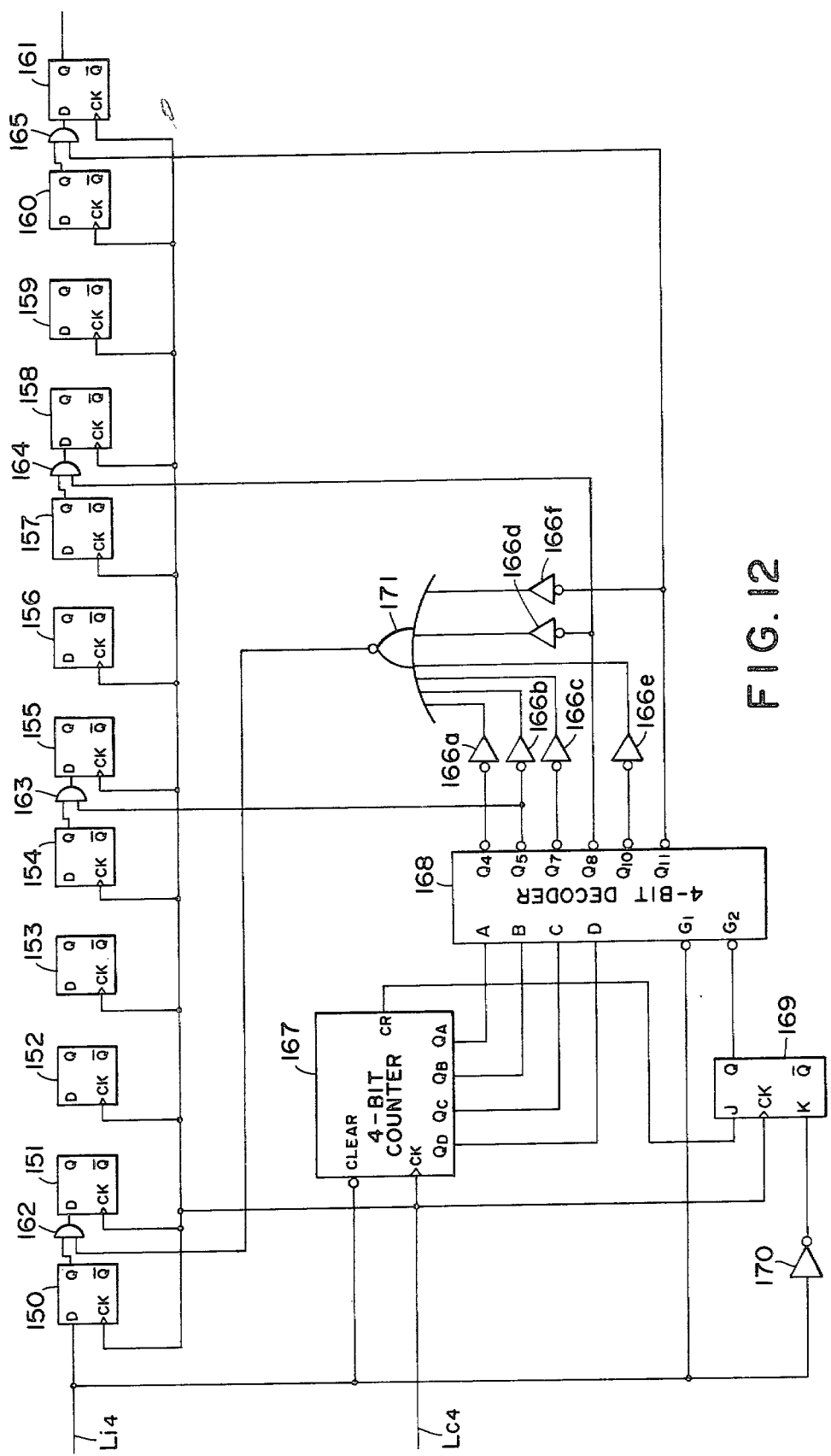
FIG. 12 is a circuit block diagram showing an arrangement for a ternary selective thinning process.

FIG. 12 shows the structure of the circuit E4 (FIG. 2B for said ternary selective thinning process, in which the binary image signals, after being subjected to smoothing process in the auxiliary scanning direction by the circuit of FIG. 8A, are entered on a bit-by-bit basis from the input line Li4 and successively transferred to the flip-flops 150–161 in response to the clock pulses supplied from a clock line Lc4. The circuit further comprises AND gates 162–165, inverters 166a–166f and 170, a 4-bit binary counter 167 with synchronized clearing, a 4-bit binary decoder 168, a flip-flop 169 and a NOR gate 171.

At first there will be explained the procedure for converting a black run of 4 bits (1, 1, 1, 1, 0) into a black run of 3 bits (0, 0, 1, 1, 1). When the signals 1, 1, 1, 1, 0 are stored in the flip-flops 150–154, the 4-bit counter 167 releases, from the output ports QD, QC, QB and QA thereof, the signals 0, 1, 0, 0 which are the binary presentation of the number of consecutive bits of the black run, the signals being supplied to the input ports D, C, B and A of the 4-bit decoder 168. Upon an entry of a signal "0" from the input line Li4 and of a clock pulse from the clock line Lc4, 4-bit counter 167 is cleared to release, from output ports QD, QC, QB and QA thereof, the signals 0, 0, 0, 0 upon receipt of which the 4-bit decoder 168 produces the signals 0, 1, 1, 1, 1, 1 respectively from the output ports Q4–Q11. In more general terms, the decoder releases a signal "0" from a port Qn and signals "1" from other ports for a black run-length of n bits. Signal "0" from the port Q4 is inverted to "1" by the inverter 166a and supplied to the NOR gate 171 while other signals "1" being inverted to "0" by the inverters 166b–166f, whereby NOR gate 171 releases a signal "0" which is supplied to an input port of the AND gate 162, thus obtaining a signal "0" therefrom. Therefore the flip-flop 151 connected to the output of AND gate 162 receives a signal "0" regardless of the output from the flip-flop 150. Thus the flip-flop 150 stores the aforementioned signal "0" supplied from the input line Li4, the flip-flop 151 stores a signal "0", and the flip-flops 152–154 store the signals "1" transferred from the output ports Q of the flip-flops 151–153. In this manner the information stored in flip-flops 150–154 are changed from 1, 1, 1, 1, 0 to 0, 0, 1, 1, 1, thus achieving the conversion of a black run of 4 bits into a black run of 3 bits.

In the following there will be explained the procedure for converting a black run of 5 bits into a black run of 3 bits. In this procedure the flip-flops 150–155 respectively store the signals 1, 1, 1, 1, 1, 0, and the output ports Q4–Q11 of the decoder 168 release the signals 1, 0, 1, 1, 1, 1 in a similar manner as explained above. Thus the AND gates 162 and 163, each receiving at least one input signal "0", both release the output signal "0". In this manner the signals stored in the flip-flops 150–155 are converted from 1, 1, 1, 1, 1, 0 to 0, 0, 1, 1, 1, 0, thus achieving the conversion from 5 bits to 3 bits. Similarly a black run of 7 bits is converted into a black run of 6 bits by the output signal "0" from the AND gate 162, and a black run of 8 bits is converted into a black run of 6 bits by the output signals "0" from the AND gates 162 and 164. Also a black run of 10 bits is converted into a black run of 9 bits by the signal "0" from the AND gate 162, and a black run of 11 bits is converted into a black run of 9 bits by the signals "0" from the AND gates 162 and 165. In the foregoing procedures the input port G2 of the decoder 168 always receives a signal "0". For a black run of 16 bits or more, upon counting 15 the 4-bit counter 167 supplied a signal "1" from the output port CR to the input port J of the flip-flop 169. Upon counting of 16 a signal "1" is supplied to the input port J of the flip-flop 169, the output port Q thereof releases a signal "1", whereby the input ports G1 and G2 of the decoder 168 both receive the signals "1", thereby releasing the signals "1" from all the output ports Q4–Q11. Thus the AND gates 612–165 are enabled by signals "1" to transfer the signals applied thereto. Consequently the change of run-length does not take place for the black runs of 16 bits or more, and it is rendered possible to prevent the erroneous function of the decoder 168 in the case of the overflow of the binary counter 167.

Upon a subsequent entry of a signal "0" to the input line Li4, the flip-flop 169 receives at the input port K a signal "1" through the inverter 170, and is therefore reset in response to the subsequent clock pulse supplied from the line Lc4. The image signals subjected to the ternary selective thinning in the foregoing manner are supplied from the output port Q of the flip-flop 161 to the bandwidth compressor B2 shown in FIG. 2A.

The above-explained ternary selective thinning eliminates black picture elements from the pattern shown in FIG. 6A in 15 portions P9 without practical inconvenience to obtain a pattern as shown in FIG. 6B, and such a partial grouping of the black run-lengths in consideration of the frequency of occurrences thereof allows to reduce the number of objects to be coded, thereby improving the signal compression ratio while reducing the deterioration of the image quality.

In the foregoing the circuits E1–E4 in FIG. 2B have been explained by the examples shown in FIGS. 5A, 7A, 8A and 12. Thus the image processing performed by the image processor E shown in FIG. 2B converts the binary image signals as shown in FIGS. 6A, 10A and 11A into those as shown in FIGS. 6B, 10C and 11C, respectively. After such processing the image signals are supplied to the bandwidth compressor B2 shown in FIG. 2A, which compresses the signals by coding which is featured in improved signal compression ratio fully utilizing the properties of the binary image signals resulting from the above-mentioned image processing in the processor E.

The binary image or picture signals after the image processing are characterized by the facts:

(1) that they do not contain black runs of 4, 5, 7, 8, 10 or 11 bits due to the ternary selective thinning; and
(2) that they show a very strong interline correlation and have a very high percentage of 3-bit black runs due to the processes of spot elimination, smoothing and ternary selective thinning.

The above-mentioned characteristic (1) is utilized in a first coding method while the characteristic (2) is utilized in a second coding method, both of which will be discussed in the following.

The first coding method utilizes the currently popular Modified Huffman coding (hereinafter called "MH coding"), with a certain modification to meet the properties of the binary image signals after the above-mentioned image processes.

The MH coding with the above-mentioned modification will be hereinafter called "MMH coding". The MH codes and MMH codes can be compared in FIGS. 13A and 13B, respectively showing terminate codes and make-up codes. The terminate codes are for coding of black or white runs of 0 to 63 bits, while the make-up codes are for coding of black or white runs of 64 to 1728 bits and for coding of end-of-line (EOL) signal. In terminate codes, the MMH codes for white runs are identical with the MH codes but those for black runs are different from the MH codes as will be explained later. In make-up codes, the MMH codes are identical with the MH codes for both black and white runs. The binary image signals processed as explained in the foregoing and supplied to the bandwidth compressor B2 in FIG. 2A are at first subjected to the identification whether they are composed of a white or black run, and then are coded either by the terminate codes or by the make-up codes according to the run length. For example a white run of 63 bits ($<64$) is coded as "00110100" by the terminate code shown in FIG. 13A. Also a white run of 70 bits ($<64$) is at first coded by the make-up code "11011" for a white run of 64 bits as shown in FIG. 13B, and then coded as "1110" by the terminate code for the white run of 6 bits ($=70-64$). The black runs are also coded in a similar manner, but because of the absence of black runs of 4, 5, 7, 8, 10 and 11 bits due to the aforementioned image processing, the codes for such run-lengths become no longer necessary. In the MMH coding, therefore, it becomes possible to allot the highly compressed short codes, which are allotted to such black run-lengths in the MH coding, to other black run-lengths, thereby achieving a high signal compression ratio. For example a black run of 12 bits ($<64$) is coded as "0010" by the MMH terminate code shown in FIG. 13A, which is shorter than the corresponding MH code "0000111". The MMH codes for black runs of 64 bits or larger are same as the MH codes. For example a black run of 70 bits (more than 64 bits) is at first coded as "0000001111" by the make-up code for the black run of 64 bits as shown in FIG. 13B, and then coded as "0010" by the MMH terminate code for the black run of 6 bits ($=70-64$) shown in FIG. 13A.

Figure 14:
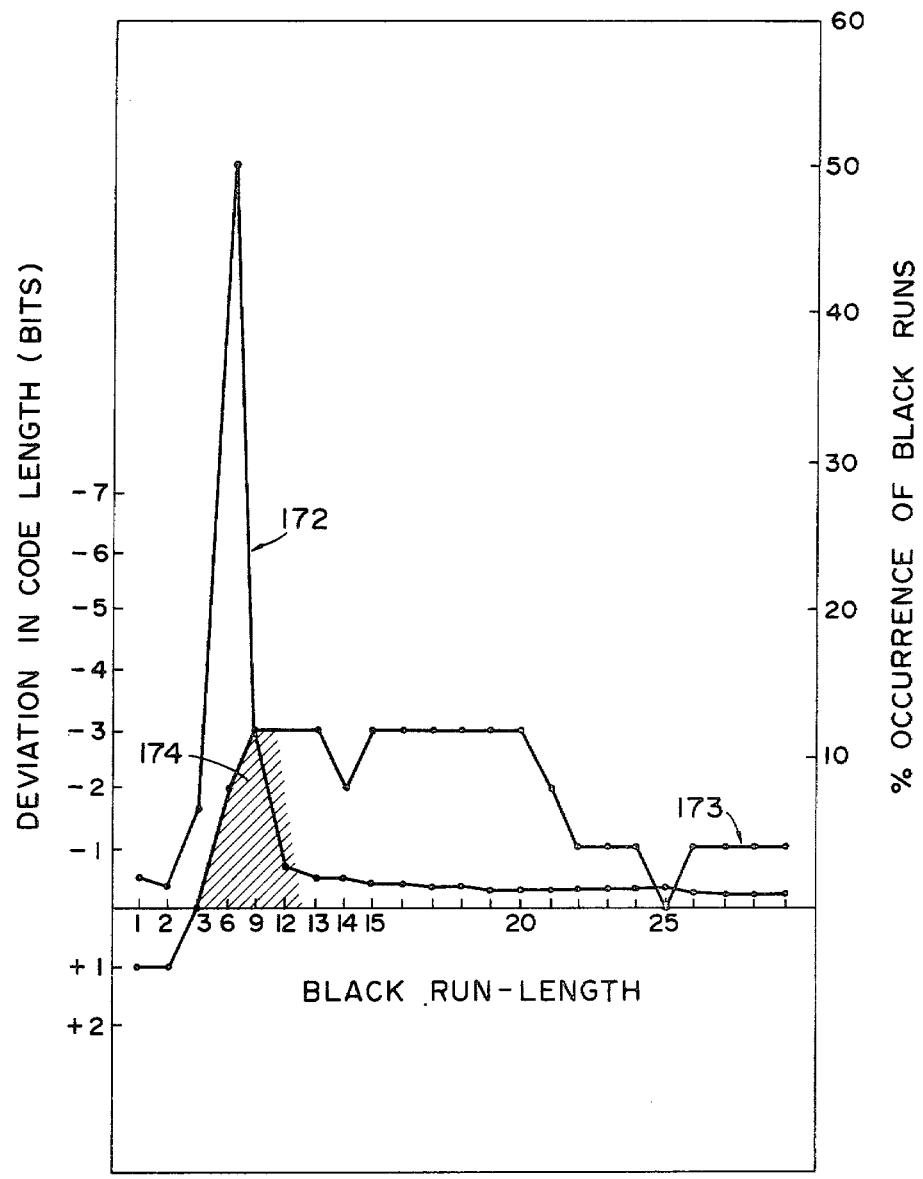
FIG. 14 is a plot showing the deviation in code length and the percentage occurrence of black runs as a function of black run-length.

FIG. 14 shows the deviation of code length between the MMH coding and the MH coding (curve 173) and the probability of occurrence of various black run-lengths (curve 172) in ordinary originals as a function of the black run-length. It will be seen from curve 172 that the probability of occurrence is particularly high for the run lengths from 3 to 12 bits. Also it will be seen from curve 173 that the deviation between two coding systems significantly contribute to the improvement in the compression ratio particularly in the hatched area 174 where the probability of occurrence is high. Thus the use of the MMH coding improves the compression ratio by 15 to 20% in comparison with the MH coding. The binary image signals obtained by scanning an image area alternately contains black runs and white runs, so that the use of the MMH coding to such black runs has an effect of accumulation of the deviations, thus enabling a very efficient compression for the entire information.

Figure 15A:
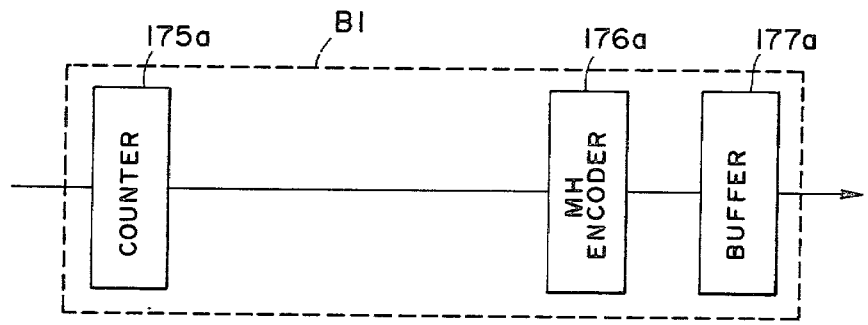
FIG. 15A is a schematic block diagram of a bandwidth compressor for the MH coding.
Figure 15B:
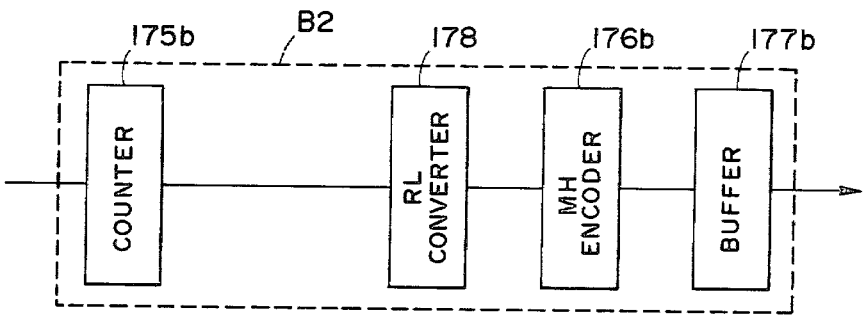
FIG. 15B is a schematic block diagram of a bandwidth compressor for the MMH coding.
Figure 15C:
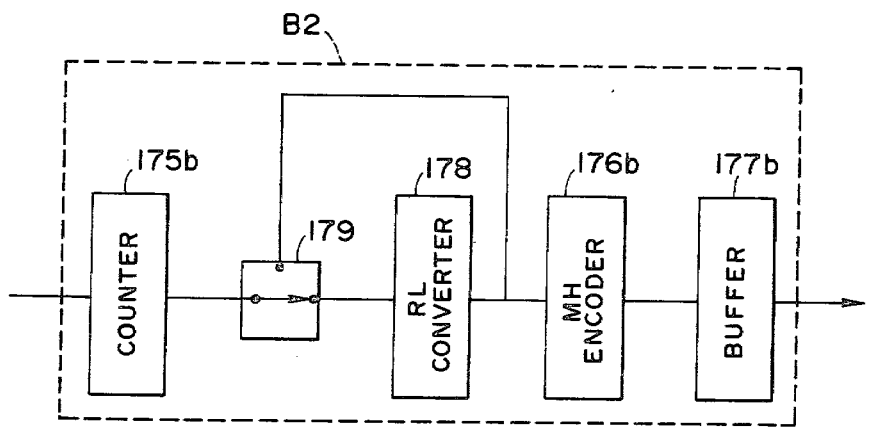
FIG. 15C is a schematic block diagram of a bandwidth compressor for both MH and MMH coding.

FIG. 15A shows the structure of the bandwidth compressor B1 (FIG. 1) for the MH coding, and FIGS. 15B and 15C show the structures of the bandwidth compressor (FIG. 2A) for the MMH coding. In FIG. 15A there are shown a counter 175a for counting the length of a black or white run in the binary image signals and supplying thus counted length in a binary number, an MH coding circuit 176a composed for example of a read-only memory for conducting the MH coding according to the binary number, and a buffer memory 177a for temporarily storing the MH code and then supplying the codes in succession to the modifier C1 shown in FIG. 1, the buffer memory being provided for matching the coding speed with the transmission rate to the telephone line. In this manner the binary image signals supplied to the counter 175a are converted into the corresponding MH codes supplied from buffer memory 177a.

In FIG. 15B there are shown a counter 175b for counting the length of white or black runs in the binary image signals and for supplying thus counted length in the form of a binary number, a run-length converting circuit 178 which does not alter the length of white runs or of black runs of 0, 3 or L ($\geq 64$) bits but alters the length of black runs of 1, 2, 6, 9 or N ($12 \leq N \leq 63$) respectively to 5, 4, 2, 1 or N−6 bits (see FIGS. 13A and 13B), an MH coding circuit 176b composed for example of a read-only memory, wherein run-length converting circuit 178 and MH coding circuit 176b constituting an MMH coding circuit in combination, and a buffer memory 177b for temporarily storing thus obtained MMH codes and supplying said codes in succession to the modifier C2 shown in FIG. 2A. In this manner the binary image signals supplied to the counter 175b are converted into the corresponding MMH codes to be obtained from the buffer memory 177b.

The circuit shown in FIG. 15C allows to arbitrarily select the circuit of FIG. 15A or of FIG. 15B by means of a switch 179, thereby enabling communication with the facsimile apparatus utilizing the MH coding as well as those utilizing the MMH coding. Although the foregoing explanation has been made in particular connection with the MH coding which is a one-dimensional coding system for coding one scan line at a time, it is also possible to achieve the improvement in the compression ratio in a similar manner on the Wyle coding which is another one-dimensional coding.

The second coding system in accordance with the present invention belongs to a two-dimensional coding wherein two or more scan lines are coded collectively or in succession.

Figure 16A:
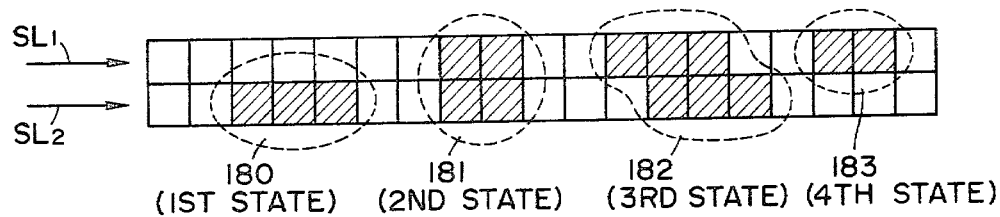
FIGS. 16A–16C are views showing the various states of combination of black runs.
Figure 16B:
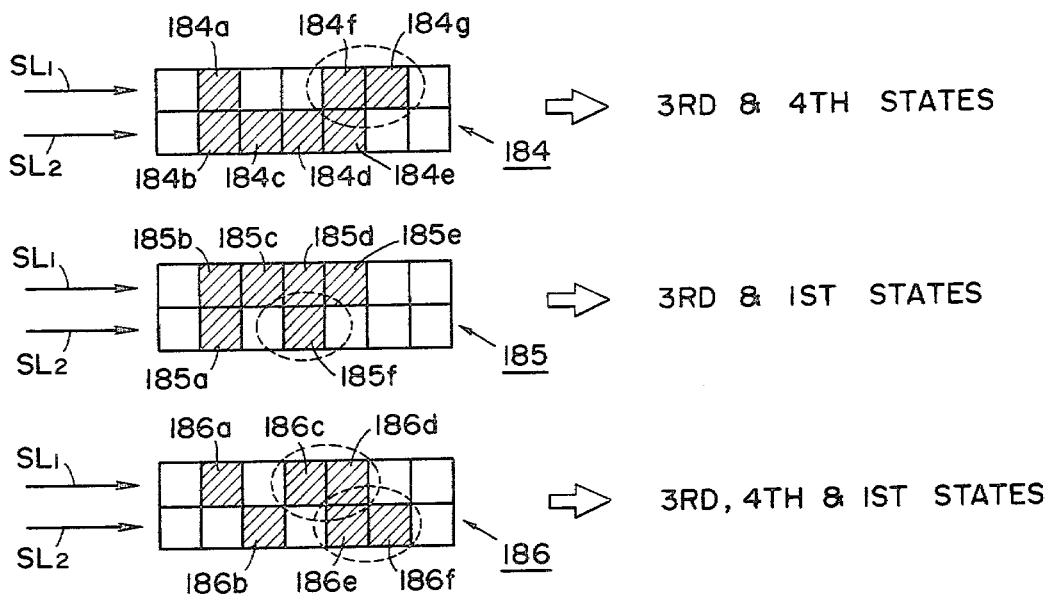
Figure 16C:
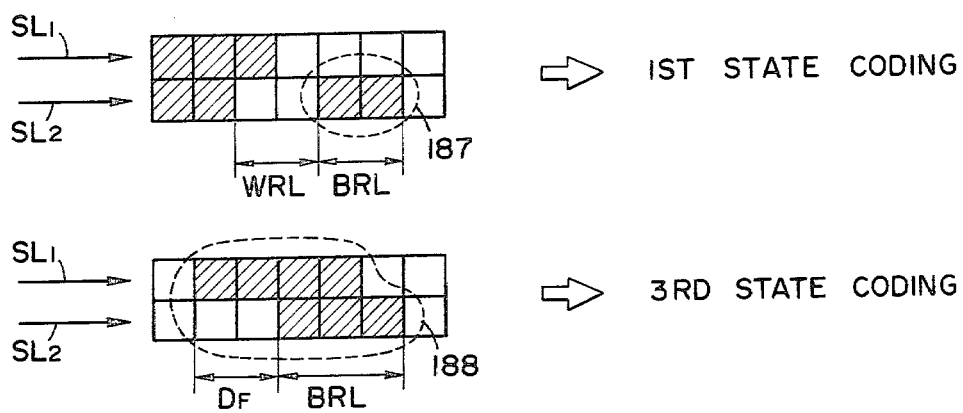

Referring to FIGS. 16A to 16C, the scan line indicated by the arrow SL1 and that indicated by the arrow SL2 will be respectively called the preceding line and the subject line. FIG. 16A shows four basic states 180–183 of connection of black runs in the preceding and subject lines, and it will be explained in the following that the complicated connections as shown in FIGS. 16B and 16C can be interpreted as the combinations of said four basic states.

In FIG. 16A there are shown a first state 180 in which the black run on the subject line is not connected to the black run on the preceding line, a second state 181 in which the black run on the subject line is connected to and the same as the black run on the preceding line as regards the run-length and position thereof, a third state 182 in which the black run on the subject line is connected to the black run on the preceding line and in which the black runs are both continuous but are in a mutual state other than that defined in said second state, and a fourth state 183 in which the black run in the preceding line is not connected to the black run on the subject line.

FIG. 16B shows some examples of varied patterns of black runs, which may be regarded as various combinations of the above-mentioned four basic states. However, as it is preferable, for the purpose of coding, to retain a black run as long as possible in the subject line, the process of decomposition of the pattern is defined by the following conditions that the left-hand end of a pattern is always considered to belong to the third group while the rest of the pattern is considered to be composed solely of the first and fourth states (i.e., the black runs in the subject line, black runs in the preceding line and the combinations thereof), and that the connections between the black runs include not only the vertical ones but also the diagonal ones.

Under the above-mentioned conditions, the patterns 184–186 shown in FIG. 16B can be decomposed in a unitary manner to a combination of the basic states. For example the pattern 184 is composed of a third state consisting of the black picture elements 184a–184e and a fourth state pattern consisting of black picture elements 184f and 184g, while the pattern 185 is composed of a third state consisting of black picture elements 185a–185e and a first state consisting of a black picture element 185f, and the pattern 186 is composed of a third state consisting of black picture elements 186a and 186b, a fourth state consisting of black picture elements 186c and 186d, and a first state consisting of black picture elements 186e and 186f. The foregoing description only defines the connection state between the black runs on the preceding and subject lines, but does not refer to the black run-length or the white run-length between the unconnected black runs.

These factors will be explained in connection with FIG. 16C, in which it is assumed that the first (preceding) line is coded by the aforementioned first coding method which is a one-dimensional coding such as the MH coding or MMH coding. In such a situation where the position and length of black runs in the preceding line are already known, the second and fourth state patterns on the subject line can be defined by simply indicating the codes representing these states (hereinafter called "state codes"). However, for defining the first and third state patterns there will be required other codes which will be illustrated in FIG. 16C. As shown in FIG. 16C, for coding a first state pattern 187 it is necessary to define the white run length (WRL) on the subject line and the black run length (BRL) of the first state pattern succeeding thereto. Also for coding a third state pattern 188 it is necessary to define the difference DF between the start positions at the left-hand ends of two black runs on two lines and the black run length (BRL) on the subject line.

The foregoing explanation is summarized in the following Tab. 4, wherein WRL and BRL are to be coded by the aforementioned one-dimensional coding methods, in which the MMH coding is preferable for the high compression rate thereof:

TABLE 4

| State | State code | Run length codes to be added |
| --- | --- | --- |
| 1st state | 011 | WRL and BRL |
| 2nd state | 1 | — |
| 3rd state | 00 | DF and BRL |
| 4th state | 010 | — |

As shown in Tab. 4, the state code length is shortest for the second state and then for the third state, in consideration of the high probability of occurrence of these two states, and in this manner it is rendered possible to improve the compression rate.

The above-mentioned difference DF is regarded as positive when the left-hand end of the black run on the subject line is at the right of the left-hand end of the black run on the preceding as shown in the pattern 188 in FIG. 16C, and zero or negative respectively when the left-hand end of the black run on the subject line is at the same position as or at the left of the left-hand end of the black run on the preceding line. The difference codes representing these various states are summarized in Tab. 5:

TABLE 5

| Value of DF | Difference code |
| --- | --- |
| +1 | 01 |
| −1 | 00 |
| 0 | 11 |
| +N (N ≧ 2) | 100* |
| −N (N ≧ 2) | 101* |

In the above table, when the absolute value or magnitude of the difference is equal to 2 or higher, the difference code (*) is followed by the value of N coded by the one-dimensional coding method. For example the code for DF = +2 is "100011" as the MMH code for a black run of 2 bits is "011" (FIG. 13A).

FIGS. 17A and 17B show the examples of coding, by the foregoing second coding method, of the patterns 189–199 of black runs on the preceding and subject lines respectively indicated by the arrows SL1 and SL2.

As explained in the foregoing, it is assumed that the binary image signals on the preceding line are already coded and those on the subject line are to be coded as explained in the following. Each line starts with a white picture element at the left-hand end.

According to FIGS. 16A and 16B, the patterns 180–198 shown in FIG. 17A can be identified as being composed of the basic states of 1, 4, 2, 3, 3, 4, 1, 4, 1, and 3, and are coded as shown in FIG. 17B according to FIG. 16C as well as on Tabs. 4 and 5. The pattern 199 (second state) is an artificial black bit which is always attached to the final picture element of each line and is particularly necessary for the coding a line solely consisting of white picture elements. The procedure of the coding is explained more detailedly in the following.

The pattern 189, being of the first state, is coded by the state code "011" followed by an MMH code "000111" for the white run-length of 1 bit and an MMH code "011" for the black run-length of 2 bits;

The pattern 190, being of the fourth state, is coded by the state code "010";

The pattern 191, being of the second state, is coded by the state code "1";

The pattern 192, being of the third state, is coded by the state code "00" followed by the difference code "00" for a difference of −1 and an MMH code "10" for the black run-length of 3 bits;

The pattern 193, being of the third state, is coded by the state code "00" followed by the difference code "01" for a difference of +1 and an MMH code "011" for the black run-length of 2 bits;

The pattern 194, being of the fourth state, is coded by the state code "010";

The pattern 195, being of the first state, is coded by the state code "011" followed by an MMH code "000111" for the white run-length of 1 bit and an MMH code "0011" for the black run-length of 1 bit;

The pattern 196, being of the fourth state, is coded by the state code "010";

The pattern 197, being of the first state, is coded by the state code "011" followed by an MMH code "000111" for the white run-length of 1 bit and an MMH code "0011" for the black run-length of 1 bit;

The pattern 198, being of the third state, is coded by the state code "00" followed by the difference code "11" for the zero difference and an MMH code "011" for the black run-length of 2 bits; and The pattern 199, being of the second state, is coded by the state code "1".

In the foregoing discussion the connecting state of black runs is on the basis of human's pattern recognition ability, but the basic states can be identified in electrical circuitry in the following manner. For example the signals of two lines shown in FIG. 17A can be considered as the information stored in a buffer memory. Thus, by reading the content of the buffer memory from the left-hand end and two bits at a time, it is possible to obtain the signals in the order of W/W, W/B, W/W, B/W, . . . , wherein the numerator and the denominator respectively stand for the signals of the preceding and subject lines, and litters W and B respectively stand for a white bit and a black bit. In the electric circuitry it is necessary to identify the above-mentioned connecting state of the black runs by investigating these paired 2-bit signals. For the purpose of clarity, the paired 2-bit signal now investigated is called the subject mode, and that immediately preceding the subject mode is called the preceding mode. Those modes assume one of following four forms B/B, B/W, W/B and W/W.

FIG. 17C shows a buffer memory of a content the same as that of FIG. 17A, wherein the identification of the basic states can be effected at the positions 200–208, at which at least the picture element of the subject line has to be white. Thus the identification cannot be effected when the subject mode is B/B or W/B, nor when the preceding mode is W/W even if the subject mode is B/W or W/W. Consequently the classification into the basic states can be effected at a position where the preceding mode is B/B, B/W or W/B and the subject mode B/W or W/W, which lead to following six preceding-subject mode combinations of B/B-B/W, B/W-B/W, W/B-B/W, B/B-W/W, B/W-W/W and W/B-W/W. Among these, however, the combination B/W-B/W has to be eliminated since in this position the subject mode is the same as the preceding mode and the state identification cannot be made from the subject mode. Consequently the remaining five combinations of the preceding and subject modes indicate the positions allowing the identification of four basic states. Stated differently the positions for identifying the four basic states are defined by the combination of the subject mode and the preceding mode. These combinations serve to detect the right-hand end of the basic states, but each state can be identified by the history of black runs from the left-hand end to the right-hand end thereof. The history can be known from a multi-mode flag (MFLG) indicating the presence or absence of a connection between the subject state to be classified by the subject mode and the preceding state located at immediately left to the subject state, a counter MRC indicating the number of black runs in the preceding line, and a difference counter DC for indicating the difference in bit number of the left-hand ends of black runs in the subject and preceding lines. For example at the position 200 in FIG. 17C, where the preceding and subject modes being respectively W/B and W/W, MFLG is 0 since the preceding state at the left to the subject state consisting of a black run of 2 bits is W/W, MRC is 0 because of absence of a black run in the preceding line and DC need not be considered in this case, so that the subject state can be classified as the first state. At the position 201 where the preceding and subject modes being respectively B/W and W/W, MFLG is 0 as the subject state is not connected to the preceding state (189 not being connected to 190 in FIG. 17A), MRC is 1 as the preceding line contains one independent black run (counted by detecting the changes from a white bit to a black bit) and DC need not be considered in this case, so that the subject state can be classified as the fourth state. The MRC is reset after each classifying procedure. At the position 202, where the preceding and subject modes being respectively B/B and W/W, MFLG is 0 as the subject state and the preceding state (190 and 191 in FIG. 17A) are not mutually connected, MRC is 1 as the preceding line contains one independent black run and DC is 0 as the black runs in two lines start at the same position at the left-hand end thereof, so that the subject state can be classified as the second state. At the position 203 where the preceding and subject modes being respectively B/B and B/W, MFLG is 0 since the subject state and the preceding state (191 and 192 in FIG. 17A) are not mutually connected, MRC is 1 as the preceding line contains one independent black run, and DC is −1 as the left-hand end of the black run on the subject line is located by one bit to the left of the left-hand end of the black run on the preceding line, so that the subject state can be classified as the third state. The DC is reset after each classifying procedure. At the position 204 where the preceding and subject modes being respectively B/B and B/W, MFLG is 0 since the subject state and the preceding state (192 and 193 in FIG. 17A) are not mutually connected, MRC is 2 since the preceding line contains two independent black runs, and DC is 1 as the left-hand end of the black run on the subject line is located one bit at the right to the left-hand end of the black run on the preceding line, so that the subject state can be classified as the third state. Successively a fourth state is identified. At the position 205 where the preceding and the subject modes being respectively W/B and B/W, MFLG is 1 since the subject state and the preceding state (194 and 195 in FIG. 17A) are mutually connected, MRC is 1 as the preceding line contains one independent black run, and DC need not be considered in this case, so that the subject state can be classified as the first state. There follows the identification of a fourth state. At the position 206 where the preceding and subject modes being respectively W/B and W/W, MFLG is 1 since the subject state and the preceding state (196 and 197 in FIG. 17A) are mutually connected, MRC is 0 as the preceding line does not contain independent black run and DC need not be considered in this case, so that the subject state can be classified as the first state. The MFLG is reset only when the classification is carried out at a subject mode W/W.

At the position 207 where the preceding and subject modes being respectively B/B and B/W, MFLG is 0 since the preceding state and subject state (197 and 198 in FIG. 17A) are not mutually connected, MRC is 1 as the preceding line contains one independent black run and DC is 0 as the black runs in two lines start at the same position at the left-hand ends thereof, so that the subject state can be classified as the third state. The foregoing classifications can be summarized in Tab. 6, wherein the symbol "x" indicates that the value is irrelevant to the classification.

ator 212, flip-flop 213 and counters 214, 215, 216 and 217 are supplied to the encoder 218, which is composed of a read-only memory storing the codes shown in FIGS. 13A and 13B and gates and is capable of converting the binary image signals shown in FIG. 17A into the coded signals shown in FIG. 17B by suitably utilizing the above-mentioned input signals, for example the first image signals and the above-mentioned state signals. A pulse generator 219 produces, upon a completion of the classification of the state, a pulse to flip-flop 213, counter 216 and 217. The coded signals obtained from the encoder 218 are temporarily stored in a buffer memory 220 and then are supplied in succession to the modulator C2 shown in FIG. 2A. The aforementioned second

TABLE 6

| Subject state (plus succeeding state) | Preceding mode | Subject mode | MFLG (0,1) | MRC (0≦) | DC (<0 ≦) | Position in FIG. 17A | Notes |
|---|---|---|---|---|---|---|---|
| First state | W/B | W/W | 0 | 0 | x | 200 | — |
| Second State | B/B | W/W | 0 | 1 | 0 | 202 | — |
| Fourth state | B/W | W/W | 0 | 1 | x | 201 | — |
| First state (plus fourth states in the number of MRC) | */B | */W | 1 | x | x | 205, 206 | First state only when MRC is 0 |
| Third state (plus fourth states in the number of MRC −1) | */B | */W | 0 | ≧1 | x | 203, 204, 207 | Excluding second state; Third state only when MRC is 1 |

In Tab. 6 the cases of the second state are excluded from the third state because the second state can be considered as a special case of the third state.

Upon reaching the position 208 in FIG. 17C, a signal "1" is unconditionally added to the end of line to obtain a final mode of B/B constituting a second state.

Figure 18:
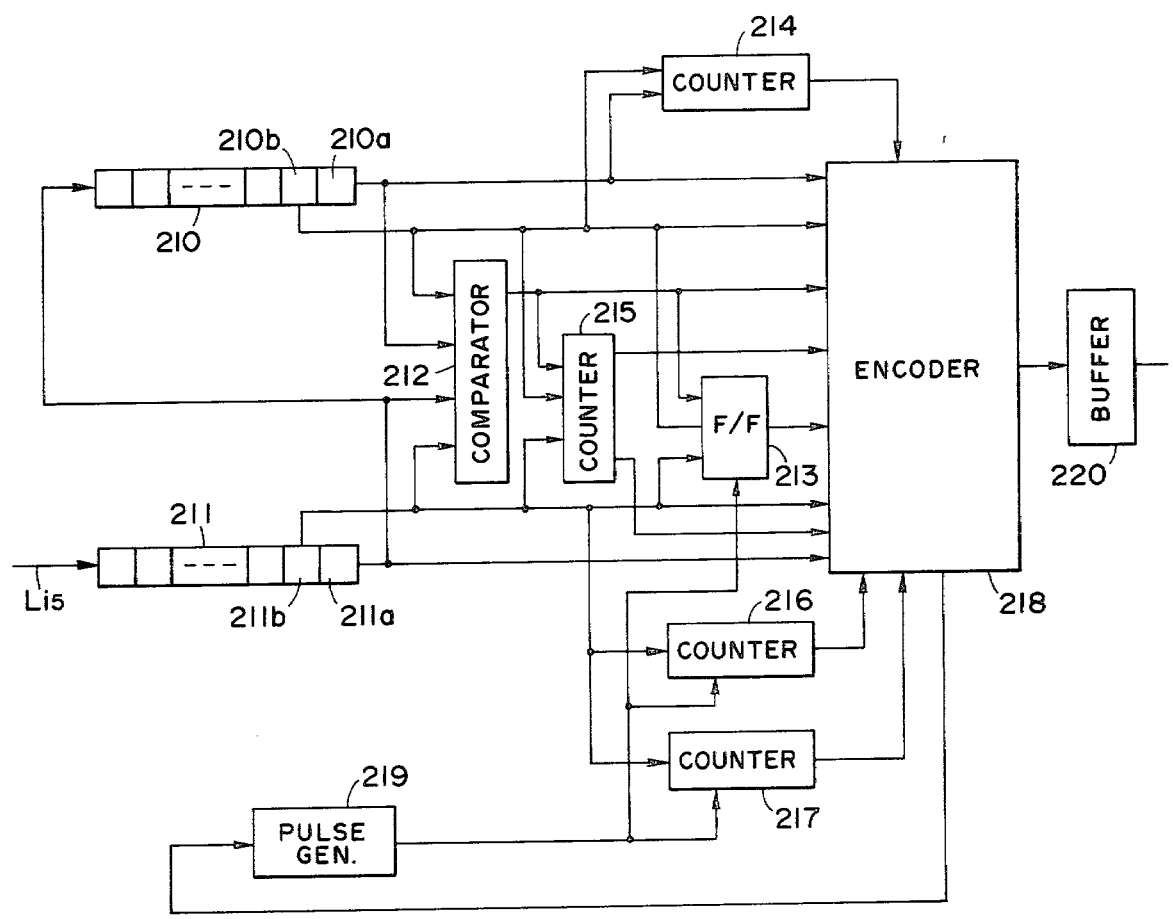
FIG. 18 is a schematic block diagram showing circuitry for second coding.

FIG. 18 shows the bandwidth compressor B2 (FIG. 2A) for the above-explained second coding process. The circuit shown in FIG. 18 is provided with buffer memories 210, 211 each for storing binary image signals of one line. The binary image signals pre-processed as explained in the foregoing are supplied from an input line Li5 and transferred through the buffer memory 211 to the buffer memory 210. In the this manner buffer memories 210 and 211 respectively store the first image signals of the preceding line as indicated by SL1 in FIG. 17A and those of the subject line as indicated by SL2 in FIG. 17A. A comparator 212 which identifies the coincidence between the subject mode and the preceding mode is capable of preparing the preceding mode from the signals supplied from the cells 210a and 211a respectively of the buffer memories 210, 211 and also the subject mode from the signals supplied from the cells 210b and 211b, and supplies an output signal to a flip-flop 213, a counter 215 and an encoder 218. Flip-flop 213 also receives the signals from cells 210b and 211b to set the above-mentioned flag MFLG. Counter 215 further receives signals from the cells 210b and 211b to count the above-mentioned black run difference DC, and supplies output signals representing the counted absolute value and the sign code for said counted value. A counter 214 receives signals from the cells 210a, 210b to count the number of black runs on the preceding line, thus performing the function of the above-mentioned MRC. Counters 216 and 217 receives the signals from the cell 211b to respectively count the run-lengths of white runs and black runs on the subject line. The output signals from cells, 210a, 210b of the buffer memory 210, cells 211a, 211b of the buffer memory 211, comparimage signals to be restored in an unrepresented receiver from the modulated and transmitted coded signals.

In the foregoing second coding method, the white run-length in the first state is defined as the distance from the left-hand end of the subject black run on the subject line to the right-hand end of the preceding black run on the subject line, or the length of white run sandwiched between two black runs on the subject line, but it is also possible to define the white run length as the distance from the left-hand end of the subject black run on the subject line to the nearest right-hand end of a black run on either line, and it is possible to further improve the compression ratio by such definition. For example in case the white run-length on the subject line is 8 bits while the distance to the right-hand end of the black run on the preceding line is 7 bits, the corresponding code according to FIG. 13A can be reduced from "10011" to "1111".

In the above-explained second coding method, it will be understood that the subject line will be used as the new preceding line for the coding of a succeeding line. In such a successive coding method there will result propagation of errors in the succeeding coding if the signals of the subject line contain errors resulting from the transmission error in the telephone line.

In such a successive coding method, therefore, one-dimensional coding is carried out for every several lines in order to prevent such possible propagation of errors, but such use of one-dimensional coding inevitably deteriorates the compression ratio. Such a drawback, nevertheless, can be prevented by combining the second coding method with the MMH coding method.

As explained detailedly in the foregoing, the information processing apparatus in accordance with the present invention allows, by selective thinning process on the binary image signals obtained by scanning the image information recorded on an original, to improve the signal compression ratio while reducing the deterioration in image quality, and is capable, by means of a switch, of selecting whether to conduct direct encoding on the image signal after the selective thinning or to conduct encoding after conversion of the signals into the signals of another lengths, whereby it is rendered possible not only to obtain a simplified apparatus realizing a high compression and a reduced extent of image quality deterioration through the use of MMH encoding but also to intercommunicate with the apparatus utilizing other encoding system such as the MH codes. Also a further improvement in the compression and a further reduction in image quality deterioration can be achieved by applying pre-processes such as elimination of isolated spots or quantizing errors to the binary image signals prior to the signal length conversion and encoding. Furthermore the signals compression ratio can be still increased by making first image signals and second image signal respectively present on first and second scan lines and representing either one state of said binary image signals, processing the signals in a selective thinning circuit to obtain state signals corresponding to the first and second scan lines, and encoding the first image signals and the state signals. In such a case the pre-processes, if applied prior to the selective thinning, will prevent the deterioration of image quality, thereby allowing to further improve the compression ratio. Also the information processing apparatus in accordance with the present invention is more advantageous than the conventional thinning process for the thinning process an graphic information.

What we claimed is:

1. Information processing apparatus, comprising: scanning means for obtaining binary image signals representing two light levels by scanning an original on which an image is recorded;
   a selective thinning circuit for converting the signals representing either one light level in said binary image signals obtained by scanning operation by said scanning means and having a length in a principal scanning direction within determined ranges into signals of respectively determined lengths;
   a run-length converting circuit for converting the signals of determined lengths obtained from said selective thinning circuit into signals of other lengths; and
   a one-dimensional coding circuit for encoding the signals thus converted by said run-length converting circuit.

2. Information processing apparatus according to claim 1, wherein said determined ranges comprise 3 to 5, 6 to 8 and 9 to 11 bits, said determined lengths being respectively 3, 6 and 9 bits.

3. Information processing apparatus, comprising:
   scanning means for obtaining binary image signals representing two light levels by scanning an original on which an image is recorded;
   a selective thinning circuit for converting the signals representing either one light level in said binary image signals obtained by scanning operation by said scanning means and having a length in the principal scanning direction within determined ranges into signals of determined lengths;
   a run-length converting circuit for converting the signals of determined lengths obtained from said selective thinning circuit into signals of other lengths;
   a one-dimensional coding circuit for encoding either of the signals of determined lengths obtained from said selective thinning circuit and the signals converted by said run-length converting circuit; and
   a switch for supplying the signals of determined lengths obtained from said selective thinning circuit to either of said run-length converting circuit and said one-dimensional coding circuit.

4. Information processing apparatus according to claim 3, wherein said determined ranges comprise 3 to 5, 6 to 8 and 9 to 11 bits, said determined lengths being respectively 3, 6 and 9 bits.

5. Information processing apparatus, comprising:
   a scanning means for obtaining binary image signals representing two light levels by scanning an original on which an image is recorded;
   pre-processing circuits for controlling inversion of the signals representing either one light level of said binary image signals obtained by scanning operation by said scanning unit to signals representing the other light level according to a state of said image;
   a selective thinning circuit for converting the signals representing either one light level in said binary image signals after pre-processing and having a length in a principal scanning direction within determined ranges into signals of determined lengths; and
   a one-dimensional coding circuit for encoding the signals obtained from said selective thinning circuit.

6. Information processing apparatus according to claim 5, wherein at least one of said pre-processing circuits comprises an isolated spot eliminating circuit for suppressing signal inversion which provides signals of either light level not exceeding a determined length and surrounded by signals of the other light level in said principal scanning direction and also in an auxiliary scanning direction substantially perpendicular to said principal scanning direction.

7. Information processing apparatus according to claim 5, wherein at least one of said pre-processing circuits comprises a main-scan smoothing circuit for suppressing signal inversion which provides signals of either light level not exceeding a determined length and surrounded by signals of the other light level in said principal scanning direction but connected at one side to the signals of said either one light level in an auxiliary scanning direction substantially perpendicular to said principal scanning direction.

8. Information processing apparatus according to claim 5, wherein at least one of said pre-processing circuits comprises a sub-scan smoothing circuit for controlling end positions of signals of either light level in said principal scanning direction and displacing said end position in said principal scanning direction so as to coincide with the end position of other signals for the same light level located adjacent to the aforementioned signals at least on one side thereof in an auxiliary scanning direction substantially perpendicular to said principal scanning direction.

9. Information processing apparatus according to claim 5, wherein said determined ranges comprise 3 to 5, 6 to 8 and 9 to 11 bits, said determined lengths being respectively 3, 6 and 9 bits.

10. Information processing apparatus according to claim 6, wherein said pre-processing circuits further comprise a main-scan smoothing circuit for suppressing signal inversion which provides signals of either light level not exceeding a determined length and surrounded by signals of the other light level in said principal scanning direction but connected at one side to signals of said either one light level in an auxiliary scanning direction substantially perpendicular to said principal scanning direction.

11. Information processing apparatus according to claim 6, wherein said pre-processing circuits further comprise a sub-scan smoothing circuit for controlling end positions of signals of either color level in said principal scanning direction and displacing said end position in said principal scanning direction so as to coincide with the end position of other signals for the same light level located adjacent to aforementioned signals at least on one side thereof in an auxiliary scanning direction substantially perpendicular to said principal scanning direction.

12. Information processing apparatus according to claim 7, wherein said pre-processing circuits further comprise a sub-scan smoothing circuit for controlling end positions of signals of either color level in said principal scanning direction and displacing said end position in said principal scanning direction so as to coincide with the end position of other signals for the same light level located adjacent to aforementioned signals at least on one side thereof in an auxiliary scanning direction substantially perpendicular to said principal scanning direction.

13. Information processing apparatus, comprising:
scanning means for obtaining binary image signals representing two light levels by scanning an original on which an image is recorded;
pre-processing circuits for controlling inversion of signals representing either one light level of said binary image signals obtained by scanning operation by said scanning unit to signals representing the other light level according to a state of said image, said pre-processing circuit comprising:
an isolated spot eliminating circuit for suppressing the signal inversion which provides signals of either light level not exceeding a determined length and surrounded by the signals of the other light level in said principal scanning direction and also in an auxiliary scanning direction substantially perpendicular to said principal scanning direction,
a main-scan smoothing circuit for suppressing the signal inversion which provides signals of either light level not exceeding a determined length and surrounded by the signals of the other light level in said principal scanning direction but connected at one side to the signals of said either one light level in an auxiliary scanning direction substantially perpendicular to said principal scanning direction, and a sub-scan smoothing circuit for controlling end positions of the signals of either light level in said principal scanning direction and displacing said end position in said principal scanning direction so as to coincide with the end position of other signals for the same light level located adjacent to the aforementioned signals at least on one side thereof in an auxiliary scanning direction substantially perpendicular to said principal scanning direction;
a selective thinning circuit for converting the signals representing either one light level in said binary image signals after said pre-processing and having a length in the principal scanning direction within determined ranges
a run-length converting circuit for converting the signals of determined lengths obtained from said selective thinning circuit into signals of other lengths; and
a one-dimensional coding circuit for encoding the signals converted by said run-length converting circuit.

14. Information processing apparatus, comprising:
scanning means for scanning an original on which an image is recorded, to obtain binary image signals representing two light levels on first and second scan lines, thus obtaining first image signals and second image signals representing either one light level;
a selective thinning circuit for converting said first and second image signals obtained by scanning operation of said scanning unit and having a length in a principal scanning direction within determined ranges into signals of determined lengths;
a circuit for forming state signals representing the states of connections on said first and second scan lines of said first and second image signals obtained from said selective thinning circuit; and
an encoder for forming coded signals from said first image signals obtained from said selective thinning circuit and said state signals.

15. Information processing apparatus according to claim 14, wherein said determined ranges comprise 3 to 5, 6 to 8 and 9 to 11 bits, said determined lengths being respectively 3, 6 and 9 bits.

16. Information processing apparatus according to claim 14, wherein said state signals represents four connection states.

17. Information processing apparatus according to claim 16, wherein said state signals comprise codes which are shorter for connection states of higher frequency of occurrence.

18. Information processing apparatus according to claim 16, wherein said determined ranges comprise 3 to 5, 6 to 8 and 9 to 11 bits, said determined lengths being respectively 3, 6 and 9 bits.

19. Information processing apparatus, comprising:
a scanning means for scanning an original on which an image is recorded, to obtain binary image signals representing two light levels on first and second scan lines, thus obtaining first image signals and second image signals representing either one light level;
pre-processing circuits for controlling inversion of the signals representing either one light level among said binary image signals obtained by scanning operation by said scanning unit to signals representing the other light level according to a state of said image;
a selective thinning circuit for converting signals representing either one light level in said binary image signals after said pre-processing and having a length in a principal scanning direction within determined ranges to signals of determined lengths;
a circuit for forming state signals representing the connection states on said first and second scan lines of said first and second image signals obtained from said selective thinning circuit; and
an encoder for forming coded signals from said first image signals obtained from said selective thinning circuit and said state signals.

20. Information processing apparatus according to claim 19, wherein at least one of said pre-processing circuits comprises an isolated spot eliminating circuit for suppressing the signal inversion which provides signals of either light level not exceeding a determined length and surrounded by the signals of the other light level in said principal scanning direction and also in an auxiliary scanning direction substantially perpendicular to sair principal scanning direction.

21. Information processing apparatus according to claim 19, wherein at least one of said pre-processing circuits comprises a main-scan smoothing circuit for suppressing the signal inversion which provides signals of either light level not exceeding a determined length and surrounded by signals of the other light level in said principal scanning direction but connected at one side to signals of said either one light level in an auxiliary scanning direction substantially perpendicular to said principal scanning direction.

22. Information processing apparatus according to claim 19, wherein at least one of said pre-processing circuits comprises a sub-scan smoothing circuit for controlling end positions of the signals of either light level in said principal scanning direction and displacing said end position in said principal scanning direction so as to coincide with the end position of other signals for the same light level located adjacent to aforementioned signals at least on one side thereof in an auxiliary scanning direction substantially perpendicular to said principal scanning direction.

23. Information processing apparatus according to claim 19, wherein said determined ranges comprise 3 to 5, 6 to 8 and 9 to 11 bits, said determined lengths being respectively 3, 6 and 9 bits.

24. Information processing apparatus according to claim 19, wherein said state signals represents four connection states.

25. Information processing apparatus according to claim 20, wherein said pre-processing circuits further comprises a main-scan smoothing circuit for suppressing the signal inversion which provides signals of either light level not exceeding a determined length and surrounded by signals of the other light level in said principal scanning direction but connected at one side to signals of said either one light level in an auxiliary scanning direction substantially perpendicular to said principal scanning direction.

26. Information processing apparatus according to claim 20, wherein said pre-processing circuits further comprises a sub-scan smoothing circuit for controlling the end positions of the signals of either light level in said principal scanning direction and displacing said end position in said principal scanning direction so as to coincide with the end position of other signals for the same light level located adjacent to aforementioned signals at least on one side thereof in an auxiliary scanning direction substantially perpendicular to said principal scanning direction.

27. Information processing apparatus according to claim 21, wherein said pre-processing circuits further comprises a sub-scan smoothing circuit for controlling end positions of the signals of either light level in said principal scanning direction and displacing said end position in said principal scanning direction so as to coincide with the end position of other signals for the same light level located adjacent to aforementioned signals at least on one side thereof in an auxiliary scanning direction substantially perpendicular to said principal scanning direction.

28. Information processing apparatus according to claim 24, wherein said state signals comprise codes which are shorter for connection states with higher frequency of occurrence.

29. Information processing apparatus according to claim 24, wherein said determined ranges comprise 3 to 5, 6 to 8 and 9 to 11 bits, said determined lengths being respectively 3, 6 and 9 bits.

30. Information processing apparatus, comprising:

scanning means for scanning an original on which an image is recorded, to obtain binary image signals representing two light levels on first and second scan lines, thus obtaining first image signals and second image signals representing either one light level;

pre-processign circuits for controlling inversion of the signals representing either one light level among said binary image signals obtained by scanning operation by said scanning unit to the signals representing the other light level according to a state of said image, said pre-processing circuits comprising:

an isolated spot eliminating circuit for suppressing the signal inversion which provides signals of either light level not exceeding a determined length and surrounded by the signals of the other light level in a principal scanning direction and also in an auxiliary scanning direction substantially perpendicular to said principal scanning direction, a main-scan smoothing circuit for suppressing the signal inversion which provides signals of either light level not exceeding a determined length and surrounded by the signals of the other light level in said principal scanning direction but connected at one side to the signals of said either one light level in an auxiliary scanning direction substantially perpendicular to said principal scanning direction, and a sub-scan smoothing circuit for controlling end positions of the signals of either light level in said principal scanning direction and displacing said end position in said principal scanning direction so as to coincide with the end position of other signals for the same light level located adjacent to aforementioned signals at least on one side thereof in an auxiliary scanning direction substantially perpendicular to said principal scanning direction;

a selective thinning circuit for converting the signals representing either one light level in said binary image signals after said pre-processing and having a length in the principal scanning direction within determined ranges to the signals of determined lengths;

a circuit for forming state signals representing the connection states on said first and second scan lines of said first and second image signals obtained from said selective thinning circuit; and an encoder for forming coded signals from said first image signals obtained from said selective thinning circuit and said state signals.

31. Information processing apparatus, comprising:

scanning means for obtaining binary image signals representing two light levels by scanning an original on which an image is recorded;

a plurality of memory means for storing each of said binary image signals obtained by scanning operation by said scanning unit;

counting means for counting the number of signal runs each of which is stored in said plurality memory means, is time-sequentially continuous and represents either one light level;

connecting means controlled by an output of said counting means for connecting adjacent two of said memory means;

a run-length converting circuit for converting signals of determined lengths supplied through said connecting means and said plurality of memory means into signals of other lengths; and a one-dimensional coding circuit for encoding the signals converted by said run-length converting circuit.

32. Information processing apparatus according to claim 31, further comprising a switch which supplied signals of determined lengths supplied through said connecting means and said plurality of memory means to either of said run-length converting circuit and said one-dimensional coding circuit.

33. Information processing apparatus according to claim 31, further comprising pre-processing circuits for controlling inversion of the signals representing either one light level among said binary image signals obtained by scanning operation by said scanning unit to the signals representing the other light level according to a state of said image, and for supplying the output signals of said pre-processing circuits to said memory means.

34. Information processing apparatus, comprising:

scanning means for scanning an original on which an image is recorded, to obtain binary image signals representing two light levels on first and second scan lines, thus obtaining first image signals and second image signals representing either one light level;

plurality of memory means for storing each of said binary image signals obtained by scanning operation by said scanning unit;

counting means for counting the number of signal runs each of which is stored in said plural memory means, is time-sequentially continuous and represents either one light level;

connecting means controlled by the output of said counting means connecting adjacent two of said memory means;

a circuit for forming state signals representing connection states on said first and second scan lines of said first and second image signals supplied through said connecting means and said plurality of memory means; and an encoder for forming coded signals from said first image signals supplied through said connecting means and said plurality of memory means and said state signals.

35. Information processing apparatus according to claim 34, further comprising pre-processing circuits for controlling inversion of the signals representing either one light level among said binary image signals obtained by scanning operation by said scanning unit to signals representing the other light level according to a state of said image, and for supplying the output signals of said pre-processing circuits to said memory means.

* * * * *

UNITED STATES PATENT AND TRADEMARK OFFICE
CERTIFICATE OF CORRECTION

PATENT NO. : 4,229,768
DATED : October 21, 1980
INVENTOR(S) : SADASUKE KURAHAYASHI, ET AL.

It is certified that error appears in the above—identified patent and that said Letters Patent is hereby corrected as shown below:

Column 14, line 14, "Fig." should be --Figs.--;

Column 16, line 47, "column" should be --columns--;

Column 17, line 17, "11C" should be --10C--;

Column 19, line 37, "(<64)" should be --(>64)--;

Column 22, line 56, delete "the"

Column 23, line 36, "litters" should be --letters--

Column 27, line 7, "another" should be --other--'

Column 27, line 12, "other" should be --another--.

IN THE CLAIMS

Column 31, line 9, "sair" should be --said--;

Column 32, line 17, "pre-processign" should be --pre-processing--.

Signed and Sealed this

Twenty-ninth Day of December 1981

[SEAL]

Attest:

GERALD J. MOSSINGHOFF

Attesting Officer   Commissioner of Patents and Trademarks